US012631860B2

(12) United States Patent
Chang et al.

(10) Patent No.: US 12,631,860 B2
(45) Date of Patent: May 19, 2026

(54) IMAGING LENS ASSEMBLY MODULE, CAMERA MODULE AND ELECTRONIC DEVICE

(71) Applicant: LARGAN PRECISION CO., LTD., Taichung City (TW)

(72) Inventors: Lin-An Chang, Taichung City (TW); Chung Hao Chen, Taichung City (TW); Wen-Yu Tsai, Taichung City (TW); Ming-Ta Chou, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 259 days.

(21) Appl. No.: 18/474,353

(22) Filed: Sep. 26, 2023

(65) Prior Publication Data

US 2024/0111139 A1     Apr. 4, 2024

Related U.S. Application Data

(60) Provisional application No. 63/377,730, filed on Sep. 30, 2022.

(51) Int. Cl.
*G02B 17/08*        (2006.01)
*G02B 13/00*        (2006.01)
(52) U.S. Cl.
CPC ....... *G02B 17/0856* (2013.01); *G02B 13/002* (2013.01)
(58) Field of Classification Search
CPC .. G02B 17/0856; G02B 13/002; G02B 7/021;

G02B 7/026; G02B 13/0045; G02B 13/007; G02B 27/0018; G02B 13/0065; G02B 1/11; G02B 5/22; G03B 11/00; G03B 17/12; G03B 30/00
See application file for complete search history.

(56) References Cited

U.S. PATENT DOCUMENTS 6,794,066 B2     9/2004   Macchi
9,470,875 B2    10/2016   Ono
        (Continued)

FOREIGN PATENT DOCUMENTS

CN      204389721 U      6/2015
CN      208026947 U     10/2018
        (Continued)

*Primary Examiner* — Charles S Chang
(74) *Attorney, Agent, or Firm* — McClure, Qualey & Rodack, LLP

(57)        ABSTRACT

An imaging lens assembly module includes a lens barrel, a catadioptric lens assembly, an imaging lens assembly, a first fixing element and a second fixing element. The lens barrel has a first relying surface and a second relying surface, which face towards an object side of the imaging lens assembly module. The catadioptric lens assembly relies on the first relying surface. The imaging lens assembly is disposed on an image side of the catadioptric lens assembly, and relies on the second relying surface. The first fixing element is for fixing the catadioptric lens assembly to the lens barrel. The second fixing element is for fixing the imaging lens assembly to the lens barrel. The catadioptric lens assembly is for processing at least twice internal reflections of an image light in the imaging lens assembly module, and for providing optical refractive power.

17 Claims, 18 Drawing Sheets

(56) References Cited

U.S. PATENT DOCUMENTS

| | | | |
|---|---|---|---|
| 9,638,832 | B1 | 5/2017 | Su |
| 9,810,886 | B2 | 11/2017 | Mizusawa |
| 10,073,253 | B2 | 9/2018 | Lee |
| 10,146,034 | B2 | 12/2018 | Choi |
| 10,545,350 | B2 * | 1/2020 | Terai .................. G02B 27/0955 |
| 11,428,901 | B2 | 8/2022 | Nitta |
| 2015/0103226 | A1 | 4/2015 | Takahashi et al. |
| 2020/0041773 | A1 | 2/2020 | Kim |
| 2020/0110255 | A1 | 4/2020 | Bauman |
| 2021/0278639 | A1 | 9/2021 | Antier |
| 2023/0087877 | A1 | 3/2023 | Zhao et al. |

FOREIGN PATENT DOCUMENTS

| | | |
|---|---|---|
| CN | 111756958 A | 10/2020 |
| CN | 215953963 U | 3/2022 |
| CN | 108254859 B | 4/2022 |
| WO | 2021238945 A1 | 12/2021 |

* cited by examiner

IMAGING LENS ASSEMBLY MODULE, CAMERA MODULE AND ELECTRONIC DEVICE

RELATED APPLICATIONS

This application claims priority to Provisional Application Ser. No. 63/377,730, filed Sep. 30, 2022, which is herein incorporated by reference.

BACKGROUND

Technical Field

The present disclosure relates to an imaging lens assembly module and a camera module. More particularly, the present disclosure relates to an imaging lens assembly module and a camera module applicable to compact electronic devices.

Description of Related Art

With recent technology of semiconductor process advances, performances of image sensors are enhanced, so that the smaller pixel size can be achieved. Therefore, camera modules with high image quality have become an indispensable part of many modern electronics. With rapid developments of technology, applications of electronic devices equipped with camera modules increase and there is a wide variety of requirements for camera modules. However, in a conventional camera module, it is hard to balance among image quality, sensitivity, aperture size, volume or field of view. Thus, there is a need for a camera module with compactness and high image quality that can overcome the aforementioned difficulties.

SUMMARY

According to one aspect of the present disclosure, an imaging lens assembly module includes a lens barrel, a catadioptric lens assembly, an imaging lens assembly, a first fixing element and a second fixing element. The lens barrel has a first relying surface and a second relying surface, wherein both of the first relying surface and the second relying surface face towards an object side of the imaging lens assembly module. The catadioptric lens assembly relies on the first relying surface of the lens barrel. The imaging lens assembly is disposed on an image side of the catadioptric lens assembly, and relies on the second relying surface of the lens barrel. The first fixing element is for fixing the catadioptric lens assembly to the lens barrel. The second fixing element is for fixing the imaging lens assembly to the lens barrel. The catadioptric lens assembly is for processing at least twice internal reflections of an image light in the imaging lens assembly module, and for providing optical refractive power.

According to one aspect of the present disclosure, a camera module includes the imaging lens assembly module of the aforementioned aspect and an image sensor. The image sensor is disposed on an image surface of the imaging lens assembly module.

According to one aspect of the present disclosure, an electronic device includes the camera module of the aforementioned aspect.

BRIEF DESCRIPTION OF THE DRAWINGS

The present disclosure can be more fully understood by reading the following detailed description of the embodiment, with reference made to the accompanying drawings as follows:

FIG. 1B is a schematic view of the camera module according to the 1st embodiment of FIG. 1A.

FIG. 4A is a schematic view of a camera module according to the 4th embodiment of the present disclosure.

DETAILED DESCRIPTION

Figure 1A:
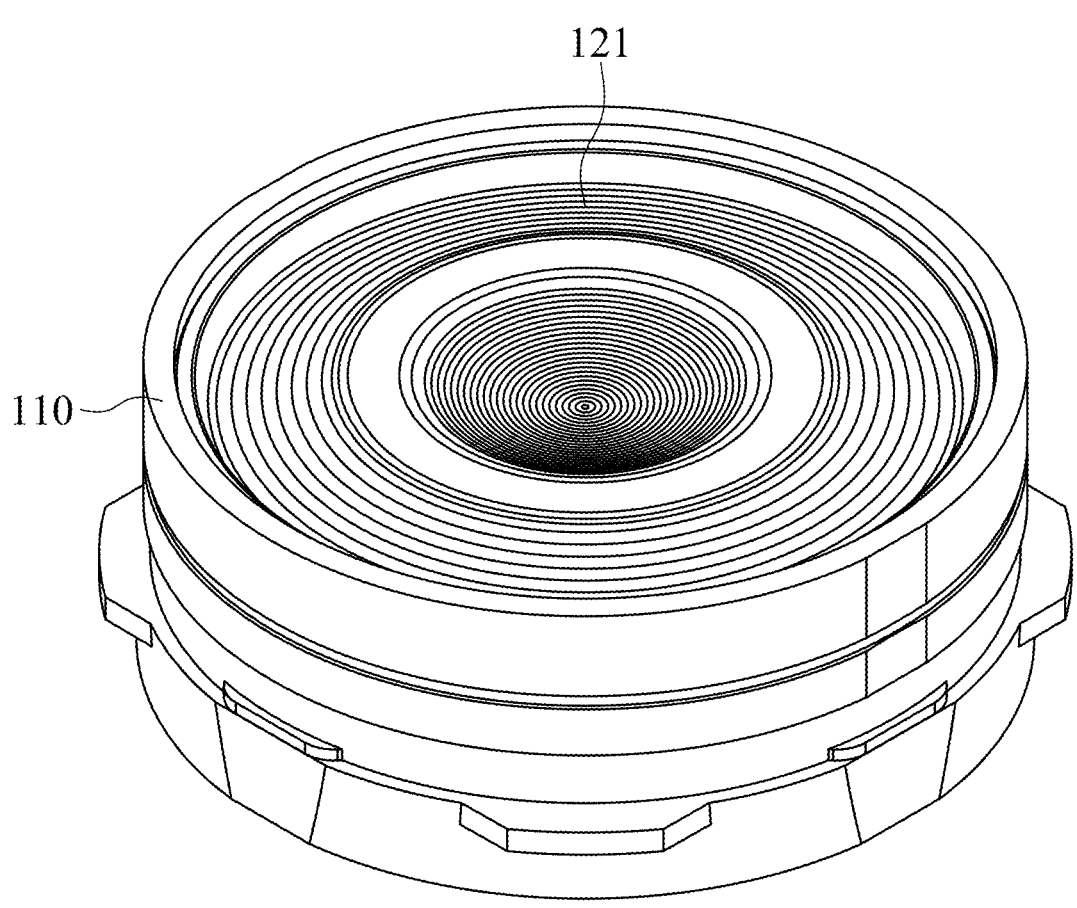
FIG. 1A is a three-dimensional schematic view of an imaging lens assembly module of a camera module according to the 1st embodiment of the present disclosure.

The present disclosure provides an imaging lens assembly module, which includes a lens barrel, a catadioptric lens assembly, an imaging lens assembly, a first fixing element and a second fixing element. The lens barrel has a first relying surface and a second relying surface, wherein both of the first relying surface and the second relying surface face towards an object side of the imaging lens assembly module. The catadioptric lens assembly relies on the first relying surface of the lens barrel. The imaging lens assembly is disposed on an image side of the catadioptric lens assembly, and relies on the second relying surface of the lens barrel. The first fixing element is for fixing the catadioptric lens assembly to the lens barrel. The second fixing element is for fixing the imaging lens assembly to the lens barrel. The catadioptric lens assembly is for processing at least twice internal reflections of an image light in the imaging lens assembly module, and for providing optical refractive power. That is, the imaging lens assembly module of the present disclosure is formed by independently assembling one set of catadioptric lens assembly and one set of imaging lens assembly into the lens barrel. Therefore, it is favorable for avoiding the assembling interference from the catadioptric lens assembly. The total track length of the imaging lens assembly module can be reduced by the catadioptric lens assembly so as to obtain the compactness thereof. The imaging light can be refracted by forming the transmission and the reflection from the lens surface of the catadioptric lens assembly, so that the amount of incident light of the imaging lens assembly module can be increased and higher resolution can be provided.

In detail, each of the first fixing element and the second fixing element can be a retainer, or retaining glue, but is not limited thereto.

The catadioptric lens assembly can include at least one catadioptric lens element, the at least one catadioptric lens element includes a first optical portion and a second optical portion. An optical axis of the imaging lens assembly module passes through the first optical portion. The second optical portion surrounds the first optical portion and disposed coaxially with the first optical portion. Each of the first optical portion and the second optical portion includes at least one optical curved surface. Therefore, it is favorable for adjusting the angle of light effectively by the lens element with two optical portions. Specifically, the areas of the first optical portion and the second optical portion are the area of the catadioptric lens element which the imaging light passing through. Further, in the catadioptric lens element, the imaging light forms three times of light traveling paths.

Each of the at least one optical curved surface of the first optical portion and the at least one optical curved surface of the second optical portion is an optical aspheric surface. Therefore, it is favorable for providing higher resolution by reducing optical aberrations.

At least one of the first optical portion and the second optical portion can include an optical reflecting surface, which is for performing at least once of the at least twice internal reflections of the image light in the imaging lens assembly module. Therefore, the internal reflections in the imaging lens assembly module can be formed so as to fold the light paths. In detail, the optical reflecting surface has a reflecting layer, which can be made of Aluminum, Silver, Chrome, Copper, Titanium, but will not be limited thereto.

Further, each of the first optical portion and the second optical portion can include an optical reflecting surface, both of the optical reflecting surfaces are for performing the at least twice internal reflections of the image light in the imaging lens assembly module. Therefore, the light paths can be folded by single catadioptric lens element so as to increase the stability of the light path.

The at least one catadioptric lens element can further include a light absorbing portion, the light absorbing portion is disposed between the first optical portion and the second optical portion, and the light absorbing portion is disposed coaxially with the first optical portion and the second optical portion. Therefore, two optical portions can be separated by the light absorbing portion, so that the probability of stray light generation inside the catadioptric lens element can be reduced.

The light absorbing portion has a light eliminating film located on one surface of the light absorbing portion, the light eliminating film includes, in order from an outer side to an inner side, a first anti-reflecting layer, a light absorbing layer and a second anti-reflecting layer. The first anti-reflecting layer is for reducing a reflectivity of an outer side of the light absorbing portion. The light absorbing layer is for absorbing a non-imaging light of the imaging lens assembly module. The second anti-reflecting layer is for reducing a reflectivity of an inner side of the light absorbing portion. Therefore, it is favorable for effectively blocking the light from the outer side and the inner side of the lens element by arranging the light eliminating film. Specifically, the light absorbing layer can include at least one of Cr thin film and CrO thin film, wherein the $SiO_2$ thin film and the $Cr_2O_3$ thin film can be stacked in the light absorbing layer on demand, but the present disclosure will not be limited thereto.

The light absorbing layer can include at least one metal thin layer. Specifically, the metal thin layer can be Cr thin film, but the present disclosure will not be limited thereto. Therefore, it is favorable for absorbing the non-imaging light of the imaging lens assembly module by applying the light absorbing feature of metal thin layer.

At least one of the first anti-reflecting layer and the second anti-reflecting layer can include a plurality of nano-ridged protruding structures. Specifically, the nano-ridged protruding structures can be made of $Al_2O_3$ material, but the present disclosure will not be limited thereto. Therefore, it is favorable for reducing the surface reflection of the catadioptric lens element.

At least one of the first anti-reflecting layer and the second anti-reflecting layer can include at least one optical thin film. Specifically, the first anti-reflecting layer and the second anti-reflecting layer can be formed by stacking the optical thin films. Therefore, it is favorable for increasing the manufacturing yield rate and prompting the light absorbing efficiency of the light absorbing portion. In detail, the optical thin film can be $SiO_2$ thin film, $TiO_2$ thin film or $Cr_2O_3$ thin film, and each of the first anti-reflecting layer and the second anti-reflecting layer can be formed by single optical thin film or a plurality of optical thin films, but the present disclosure will not be limited thereto.

The catadioptric lens assembly and the imaging lens assembly do not physically rely on each other, and forms a gap therebetween. Therefore, the mechanical interference between the catadioptric lens assembly and the imaging lens assembly can be avoided.

The imaging lens assembly module can further include a light blocking sheet disposed in the gap between the catadioptric lens assembly and the imaging lens assembly. Therefore, it is favorable for enhancing the image quality by controlling the light receiving range of the imaging lens assembly module.

When a distance along an optical axis between the first relying surface and the second relying surface is D, the following condition is satisfied: 1 mm<D<8 mm. Therefore, it is favorable for providing better efficiency for assembling the imaging lens assembly module, and providing the feasibility of mass production.

When a maximum field of view of the imaging lens assembly module is FOV, the following condition is satisfied: 1 degree≤FOV≤45 degrees. Therefore, the structure of the catadioptric lens assembly is applicable to the telephoto imaging lens assembly module with high magnification so as to provide the captured image with narrow field of view.

When an f-number of the imaging lens assembly module is FNO, the following condition is satisfied: 1.0≤FNO≤3.2. Therefore, it is favorable for providing high specification of the image quality under compact design of the imaging lens assembly module. Further, the following condition is satisfied: 1.0≤FNO≤2.7.

Each of the aforementioned features of the imaging lens assembly module can be utilized in various combinations for achieving the corresponding effects.

The present disclosure provides a camera module, which includes the imaging lens assembly module of the afore-mentioned aspect and an image sensor. The image sensor is disposed on an image surface of the imaging lens assembly module.

The present disclosure provides an electronic device includes the camera module of the aforementioned aspect.

1st Embodiment

Figure 1B:
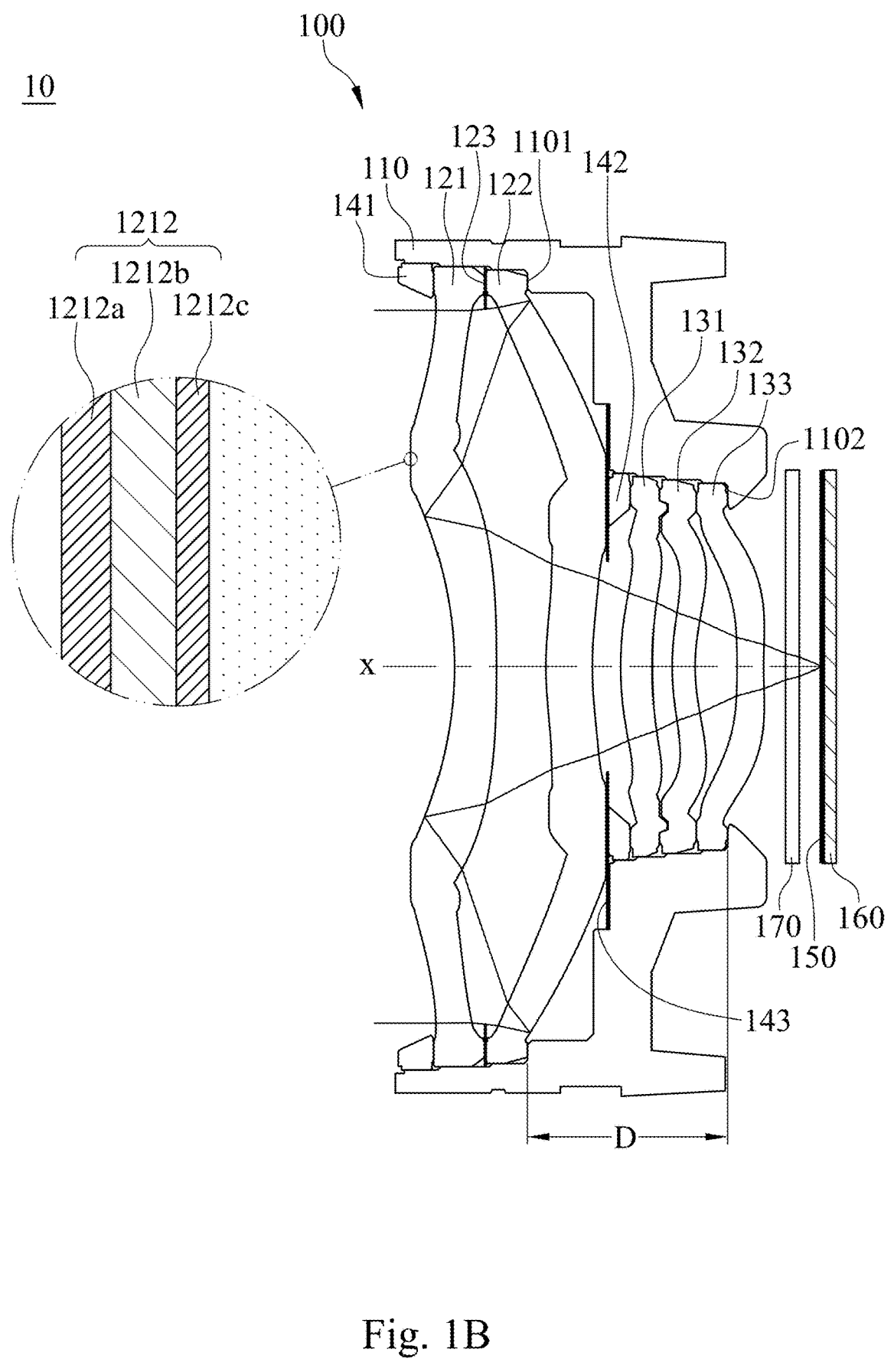
Figure 1C:
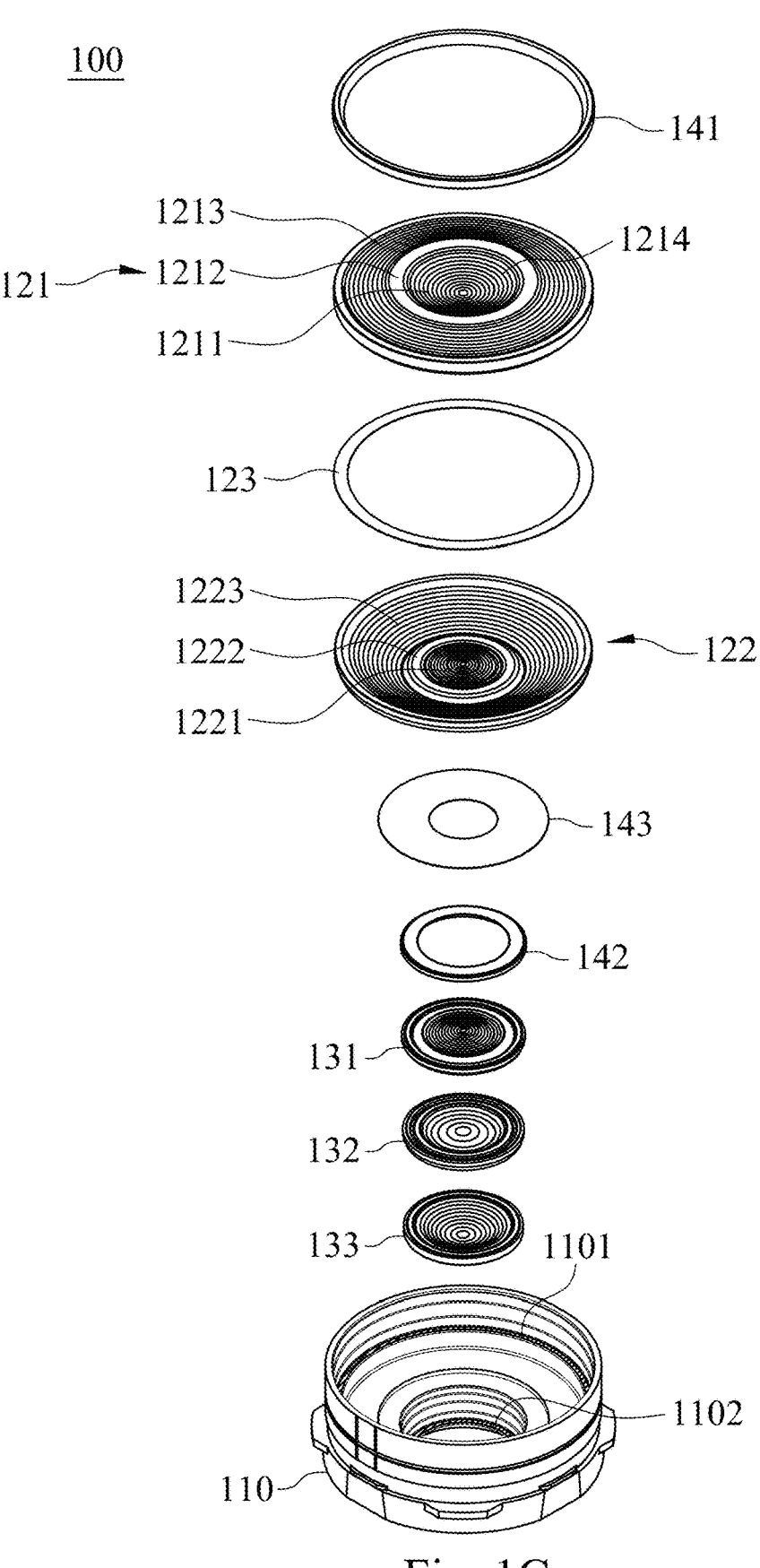
FIG. 1C is an exploded view of the imaging lens assembly module according to the 1st embodiment of FIG. 1A.
Figure 1D:
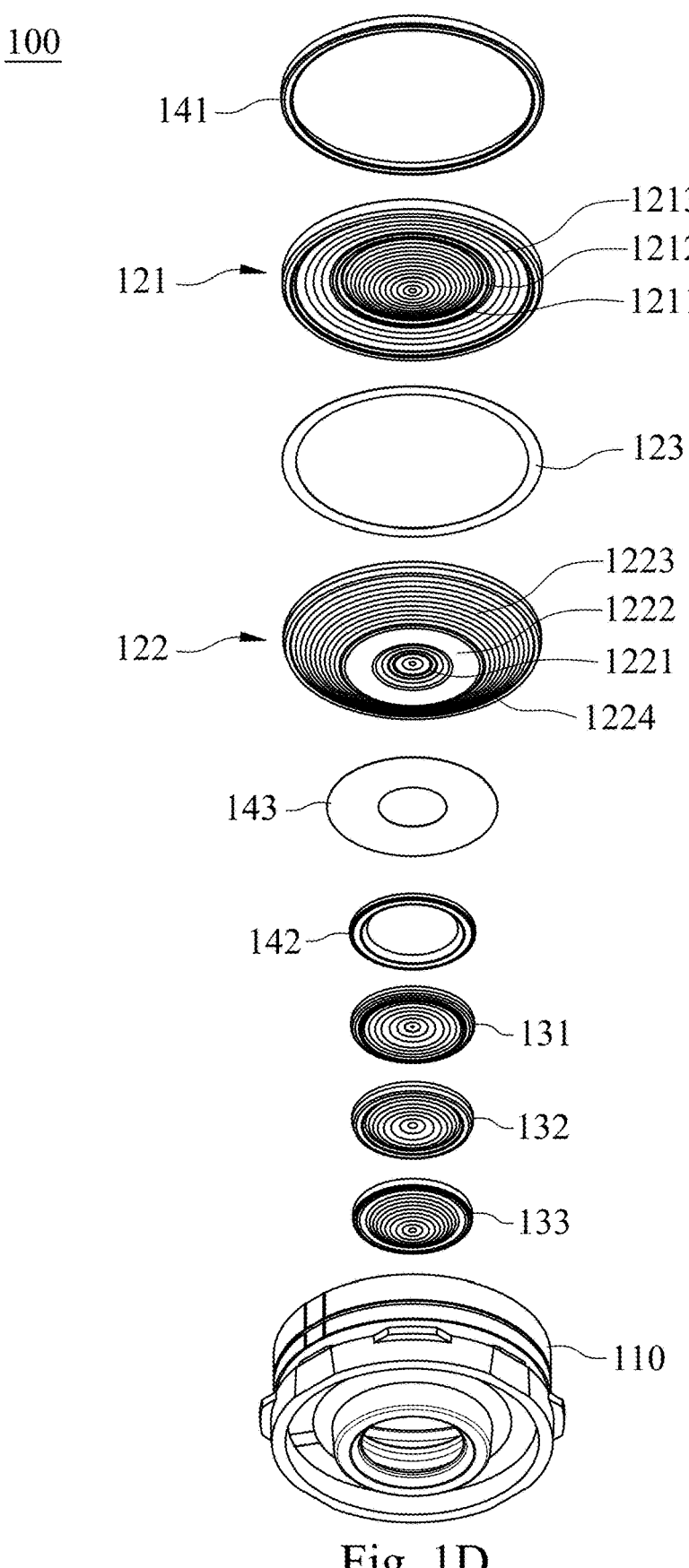
FIG. 1D is another exploded view of the imaging lens assembly module according to the 1st embodiment of FIG. 1A.

FIG. 1A is a three-dimensional schematic view of an imaging lens assembly module 100 of a camera module 10 (labelled in FIG. 1B) according to the 1st embodiment of the present disclosure. FIG. 1B is a schematic view of the camera module 10 according to the 1st embodiment of FIG. 1A. FIG. 1C is an exploded view of the imaging lens assembly module 100 according to the 1st embodiment of FIG. 1A. FIG. 1D is another exploded view of the imaging lens assembly module 100 according to the 1st embodiment of FIG. 1A. In FIG. 1A, FIG. 1B, FIG. 1C and FIG. 1D, the camera module 10 includes the imaging lens assembly module 100 and an image sensor 160, wherein the image sensor 160 is disposed on an image surface 150 of the imaging lens assembly module 100. The imaging lens assembly module 100 includes a lens barrel 110, a catadioptric lens assembly (its reference numeral is omitted), an imaging lens assembly (its reference numeral is omitted), a first fixing element 141, a second fixing element 142 and a filter 170, wherein the catadioptric lens assembly, the imaging lens assembly, the first fixing element 141 and the second fixing element 142 are disposed in the lens barrel 110, and the filter 170 is disposed between the lens barrel 110 and the image surface 150.

The lens barrel 110 has a first relying surface 1101 and a second relying surface 1102, wherein both of the first relying surface 1101 and the second relying surface 1102 face towards an object side of the imaging lens assembly module 100. The catadioptric lens assembly relies on the first relying surface 1101 of the lens barrel 110, and includes two catadioptric lens elements 121, 122; specifically, the two catadioptric lens elements 121, 122 are disposed in the lens barrel 110 in order from the object side to an image side of the imaging lens assembly module 100, and relies on the first relying surface 1101 via the catadioptric lens element 122. The imaging lens assembly is disposed on an image side of the catadioptric lens assembly, and relies on the second relying surface 1102 of the lens barrel 110; in detail, the imaging lens assembly includes three imaging lens elements 131, 132, 133, which are disposed in the lens barrel 110 in order from the object side to the image side of the imaging lens assembly module 100, and relies on the second relying surface 1102 via the imaging lens element 133. The first fixing element 141 is for fixing the catadioptric lens assembly to the lens barrel 110, that is, the catadioptric lens elements 121, 122 are fixed between the first fixing element 141 and the first relying surface 1101 of the lens barrel 110. The second fixing element 142 is for fixing the imaging lens assembly to the lens barrel 110, that is, the imaging lens elements 131, 132, 133 are fixed between the second fixing element 142 and the second relying surface 1102 of the lens barrel 110. The catadioptric lens assembly is for processing at least twice internal reflections of an image light in the imaging lens assembly module 100, and for providing optical refractive power.

In FIG. 1B to FIG. 1D, the catadioptric lens assembly and the imaging lens assembly do not physically rely on each other, and forms a gap therebetween, and the imaging lens assembly module 100 can further include a light blocking sheet 143. The light blocking sheet 143 is disposed in the gap between the catadioptric lens assembly and the imaging lens assembly. Specifically, according to the 1st embodiment, the gap is formed between the catadioptric lens element 122 and the imaging lens element 131, and the light blocking sheet 143 and the second fixing element 142 are located in the gap.

Further, the imaging lens assembly module 100 can further include another light blocking sheet 123, which is disposed between the catadioptric lens elements 121, 122.

In FIG. 1B to FIG. 1D, both of the first fixing element 141 and the second fixing element 142 are retainer.

Figure 1E:
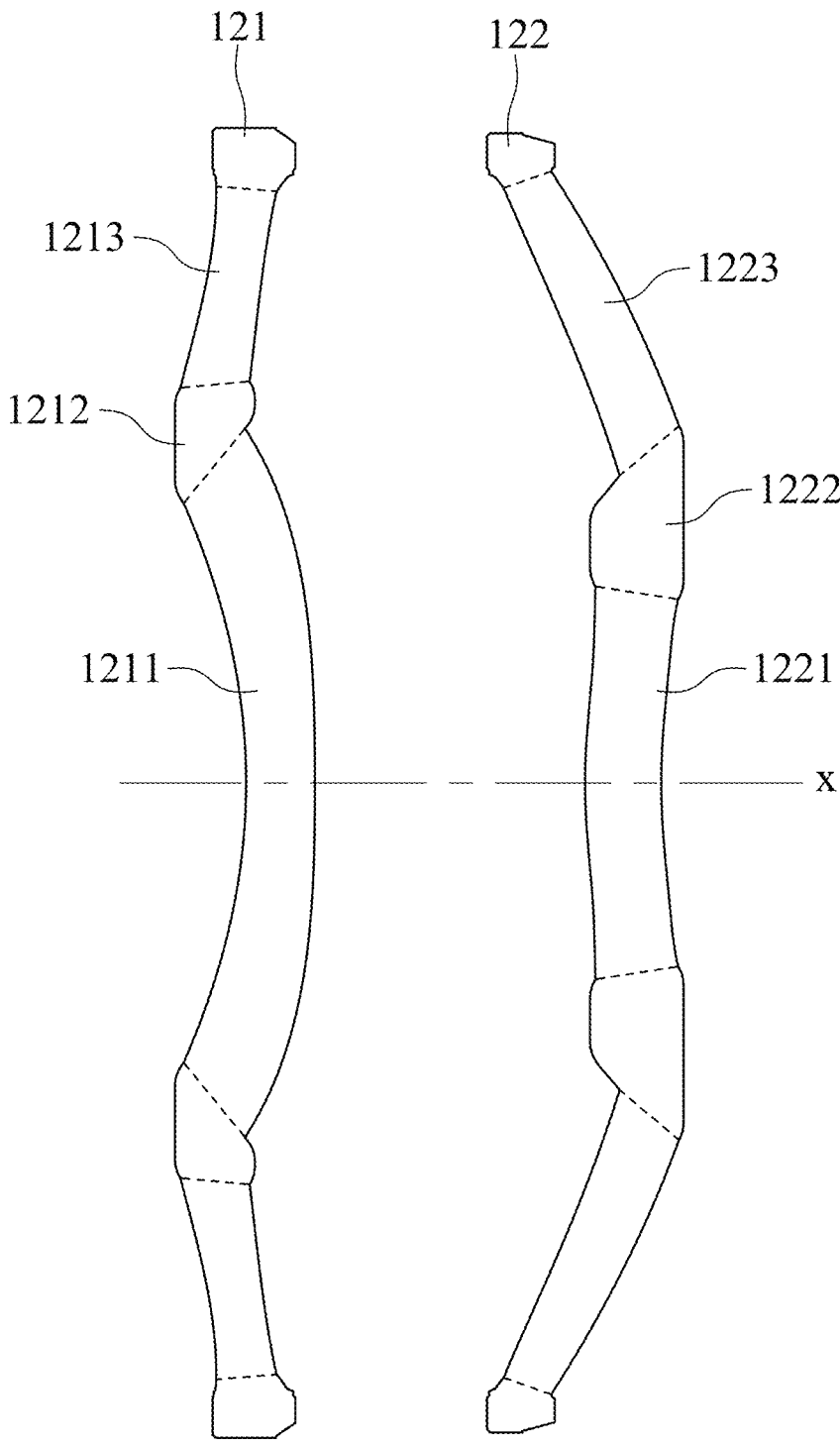
FIG. 1E is a schematic view of the catadioptric lens elements according to the 1st embodiment of FIG. 1B.

FIG. 1E is a schematic view of the catadioptric lens elements 121, 122 according to the 1st embodiment of FIG. 1B. In FIG. 1B to FIG. 1E, the catadioptric lens elements 121, 122 include first optical portions 1211, 1221 and second optical portions 1213, 1223, respectively. The optical axis x of the imaging lens assembly module 100 passes through the first optical portions 1211, 1221, the second optical portions 1213, 1223 surround the first optical portions 1211, 1221, respectively, and are disposed coaxially with the first optical portions 1211, 1221. Each of the first optical portions 1211, 1221 and the second optical portions 1213, 1223 includes at least one optical curved surface. Specifically, all of object-side surfaces and image-side surfaces of the first optical portions 1211, 1221 and the second optical portions 1213, 1223 include optical curved surfaces, which are optical aspheric surfaces.

Furthermore, in FIG. 1C and FIG. 1D, the first optical portion 1211 of the catadioptric lens element 121 includes an optical reflecting surface 1214, which is located on the object-side surface of the first optical portion 1211. The second optical portion 1223 of the catadioptric lens element 122 includes an optical reflecting surface 1224, which is located on the image-side surface of the second optical portion 1223. The optical reflecting surfaces 1214, 1224 are for performing the internal reflections of the image light in the imaging lens assembly module 100.

Moreover, in FIG. 1B and FIG. 1E, the catadioptric lens elements 121, 122 can further include light absorbing portions 1212, 1222, respectively. The light absorbing portion 1212 is disposed between the first optical portion 1211 and the second optical portion 1213, and the light absorbing portion 1212 is disposed coaxially with the first optical portion 1211 and the second optical portion 1213. The light absorbing portion 1222 is disposed between the first optical portion 1221 and the second optical portion 1223, and the light absorbing portion 1222 is disposed coaxially with the first optical portion 1221 and the second optical portion 1223.

In FIG. 1B, the light absorbing portion 1212 has a light eliminating film (its reference numeral is omitted), which is located on one surface (which is substrate) of the light absorbing portion 1212. The light eliminating film includes, in order from an outer side to an inner side (according to the 1st embodiment of FIG. 1B, that is, from the object side to the image side of the imaging lens assembly module 100), a first anti-reflecting layer 1212a, a light absorbing layer 1212b and a second anti-reflecting layer 1212c. The first anti-reflecting layer 1212a is for reducing a reflectivity of an outer side of the light absorbing portion 1212. The light absorbing layer 1212b is for absorbing a non-imaging light of the imaging lens assembly module 100, wherein the light absorbing layer 1212*b* can include at least one metal thin layer. The second anti-reflecting layer 1212*c* is for reducing a reflectivity of an inner side of the light absorbing portion 1212. Each of the first anti-reflecting layer 1212*a* and the second anti-reflecting layer 1212*c* can include at least one optical thin film.

Please refer to Table 1A as follows. In Table 1A, the material and the refractive index of the substrate of the light absorbing portion 1212, and the first anti-reflecting layer 1212*a*, the light absorbing layer 1212*b* and the second anti-reflecting layer 1212*c* of the light eliminating film according to 1st example of the 1st embodiment are listed, wherein each of the first anti-reflecting layer 1212*a* and the second anti-reflecting layer 1212*c* can be formed by stacking $SiO_2$ thin films and $TiO_2$ thin films, the light absorbing layer 1212*b* can be formed by stacking Cr thin films, $SiO_2$ thin films and $Cr_2O_3$ thin films.

TABLE 1A

| the 1st example of the 1st embodiment | | | |
|---|---|---|---|
| thin film | | material | refractive index |
| substrate | | plastic | 1.55 |
| second anti-reflecting layer | 1 | $TiO_2$ | 2.32 |
| | 2 | $SiO_2$ | 1.47 |
| | 3 | $TiO_2$ | 2.32 |
| | 4 | $SiO_2$ | 1.47 |
| light absorbing layer | 5 | Cr | — |
| | 6 | $Cr_2O_3$ | 2.32 |
| | 7 | $SiO_2$ | 1.47 |
| | 8 | Cr | — |
| | 9 | $SiO_2$ | 1.47 |
| | 10 | Cr | — |
| | 11 | $SiO_2$ | 1.47 |
| | 12 | $Cr_2O_3$ | 2.32 |
| | 13 | Cr | — |
| first anti-reflecting layer | 14 | $SiO_2$ | 1.47 |
| | 15 | $TiO_2$ | 2.32 |
| | 16 | $SiO_2$ | 1.47 |
| | 17 | $TiO_2$ | 2.32 |
| | 18 | $SiO_2$ | 1.47 |
| | 19 | $TiO_2$ | 2.32 |
| | 20 | $SiO_2$ | 1.47 |

Moreover, the structure of the light absorbing portion 1222 can be the same or similar with the structure of the light absorbing portion 1212, and will not be described again herein.

In FIG. 1B, when a distance along the optical axis x between the first relying surface 1101 and the second relying surface 1102 is D, a maximum field of view of the imaging lens assembly module 100 is FOV, and an f-number of the imaging lens assembly module 100 is FNO, the datum of the 1st embodiment are listed as the following Table 1B.

TABLE 1B

| D (mm) | 3.05 | FNO | 1.82 |
|---|---|---|---|
| FOV (degrees) | 19.1 | | |

2nd Embodiment

Figure 2:
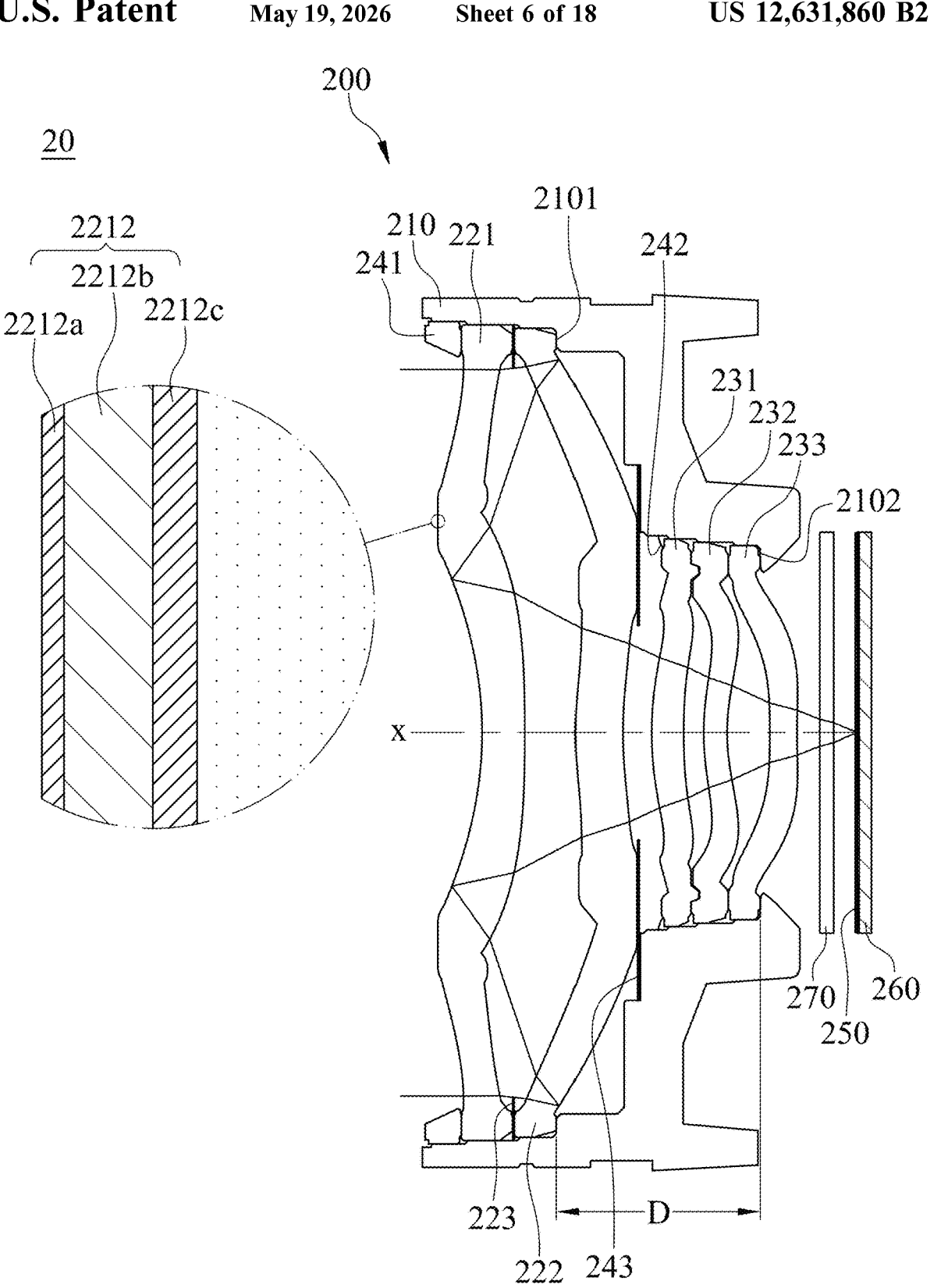
FIG. 2 is a schematic view of a camera module according to the 2nd embodiment of the present disclosure.

FIG. 2 is a schematic view of a camera module 20 according to the 2nd embodiment of the present disclosure. In FIG. 2, the camera module 20 includes an imaging lens assembly module 200 and an image sensor 260, wherein the image sensor 260 is disposed on an image surface 250 of the imaging lens assembly module 200. The imaging lens assembly module 200 includes a lens barrel 210, a catadioptric lens assembly (its reference numeral is omitted), an imaging lens assembly (its reference numeral is omitted), a first fixing element 241, a second fixing element 242 and a filter 270, wherein the catadioptric lens assembly, the imaging lens assembly, the first fixing element 241 and the second fixing element 242 are disposed in the lens barrel 210, and the filter 270 is disposed between the lens barrel 210 and the image surface 250.

The lens barrel 210 has a first relying surface 2101 and a second relying surface 2102, wherein both of the first relying surface 2101 and the second relying surface 2102 face towards an object side of the imaging lens assembly module 200. The catadioptric lens assembly relies on the first relying surface 2101 of the lens barrel 210, and includes two catadioptric lens elements 221, 222; specifically, the two catadioptric lens elements 221, 222 are disposed in the lens barrel 210 in order from the object side to an image side of the imaging lens assembly module 200, and relies on the first relying surface 2101 via the catadioptric lens element 222. The imaging lens assembly is disposed on an image side of the catadioptric lens assembly, and relies on the second relying surface 2102 of the lens barrel 210; in detail, the imaging lens assembly includes three imaging lens elements 231, 232, 233, which are disposed in the lens barrel 210 in order from the object side to the image side of the imaging lens assembly module 200, and relies on the second relying surface 2102 via the imaging lens element 233. The first fixing element 241 is for fixing the catadioptric lens assembly to the lens barrel 210, that is, the catadioptric lens elements 221, 222 are fixed between the first fixing element 241 and the first relying surface 2101 of the lens barrel 210. The second fixing element 242 is for fixing the imaging lens assembly to the lens barrel 210, that is, the imaging lens elements 231, 232, 233 are fixed between the second fixing element 242 and the second relying surface 2102 of the lens barrel 210. The catadioptric lens assembly is for processing at least twice internal reflections of an image light in the imaging lens assembly module 200, and for providing optical refractive power.

The catadioptric lens assembly and the imaging lens assembly do not physically rely on each other, and forms a gap therebetween, and the imaging lens assembly module 200 can further include a light blocking sheet 243. The light blocking sheet 243 is disposed in the gap between the catadioptric lens assembly and the imaging lens assembly. Specifically, according to the 2nd embodiment, the gap is formed between the catadioptric lens element 222 and the imaging lens element 231, and the light blocking sheet 243 and the second fixing element 242 are located in the gap.

Further, the imaging lens assembly module 200 can further include another light blocking sheet 223, which is disposed between the catadioptric lens elements 221, 222.

According to the 2nd embodiment, the first fixing element 241 is a retainer, the second fixing element 242 is fixing glue.

The catadioptric lens element 221 include a first optical portion (its reference numeral is omitted), a second optical portion (its reference numeral is omitted) and a light absorbing portion 2212. The optical axis x of the imaging lens assembly module 200 passes through the first optical portion, the second optical portion surrounds the first optical portion, and is disposed coaxially with the first optical portion. The light absorbing portion 2212 is disposed between the first optical portion and the second optical portion, and the light absorbing portion 2212 is disposed coaxially with the first optical portion and the second optical portion. Each of the first optical portion and the second optical portions includes at least one optical curved surface. The light absorbing portion 2212 has a light eliminating film (its reference numeral is omitted), which is located on one surface (which is substrate) of the light absorbing portion 2212. The light eliminating film includes, in order from an outer side to an inner side (according to the 2nd embodiment of FIG. 2, that is, from the object side to the image side of the imaging lens assembly module 200), a first anti-reflecting layer 2212a, a light absorbing layer 2212b and a second anti-reflecting layer 2212c. The first anti-reflecting layer 2212a is for reducing a reflectivity of an outer side of the light absorbing portion 2212. The light absorbing layer 2212b is for absorbing a non-imaging light of the imaging lens assembly module 200, wherein the light absorbing layer 2212b can include at least one metal thin layer. The second anti-reflecting layer 2212c is for reducing a reflectivity of an inner side of the light absorbing portion 2212. Each of the first anti-reflecting layer 2212a and the second anti-reflecting layer 2212c can include at least one optical thin film.

Please refer to Table 2A as follows. In Table 2A, the material and the refractive index of the substrate of the light absorbing portion 2212, and the first anti-reflecting layer 2212a, the light absorbing layer 2212b and the second anti-reflecting layer 2212c of the light eliminating film according to 1st example of the 2nd embodiment are listed.

TABLE 2A

| the 1st example of the 2nd embodiment | | | |
|---|---|---|---|
| thin film | | material | refractive index |
| substrate | | plastic | 1.55 |
| second anti-reflecting layer | 1 | $TiO_2$ | 2.32 |
| | 2 | $SiO_2$ | 1.47 |
| | 3 | $TiO_2$ | 2.32 |
| | 4 | $SiO_2$ | 1.47 |
| light absorbing layer | 5 | Cr | — |
| | 6 | $Cr_2O_3$ | 2.32 |
| | 7 | $SiO_2$ | 1.47 |
| | 8 | CrO | — |
| | 9 | $SiO_2$ | 1.47 |
| | 10 | CrO | — |
| | 11 | $SiO_2$ | 1.47 |
| | 12 | $Cr_2O_3$ | 2.32 |
| | 13 | Cr | — |
| first anti-reflecting layer | 14 | $SiO_2$ | 1.47 |

Moreover, the structure of the catadioptric lens element 222 can be the same or similar with the structure of the catadioptric lens element 221, and will not be described again herein.

The first optical portion of the catadioptric lens element 221 includes an optical reflecting surface (its reference numeral is omitted), which is located on the object-side surface thereof. The second optical portion of the catadioptric lens element 222 includes an optical reflecting surface, which is located on the image-side surface thereof. The optical reflecting surfaces are for performing the internal reflections of the image light in the imaging lens assembly module 200.

In FIG. 2, when a distance along the optical axis x between the first relying surface 2101 and the second relying surface 2102 is D, a maximum field of view of the imaging lens assembly module 200 is FOV, and an f-number of the imaging lens assembly module 200 is FNO, the datum of the 2nd embodiment are listed as the following Table 2B.

TABLE 2B

| D (mm) | 3.05 | FNO | 1.82 |
|---|---|---|---|
| FOV (degrees) | 19.1 | | |

3rd Embodiment

Figure 3:
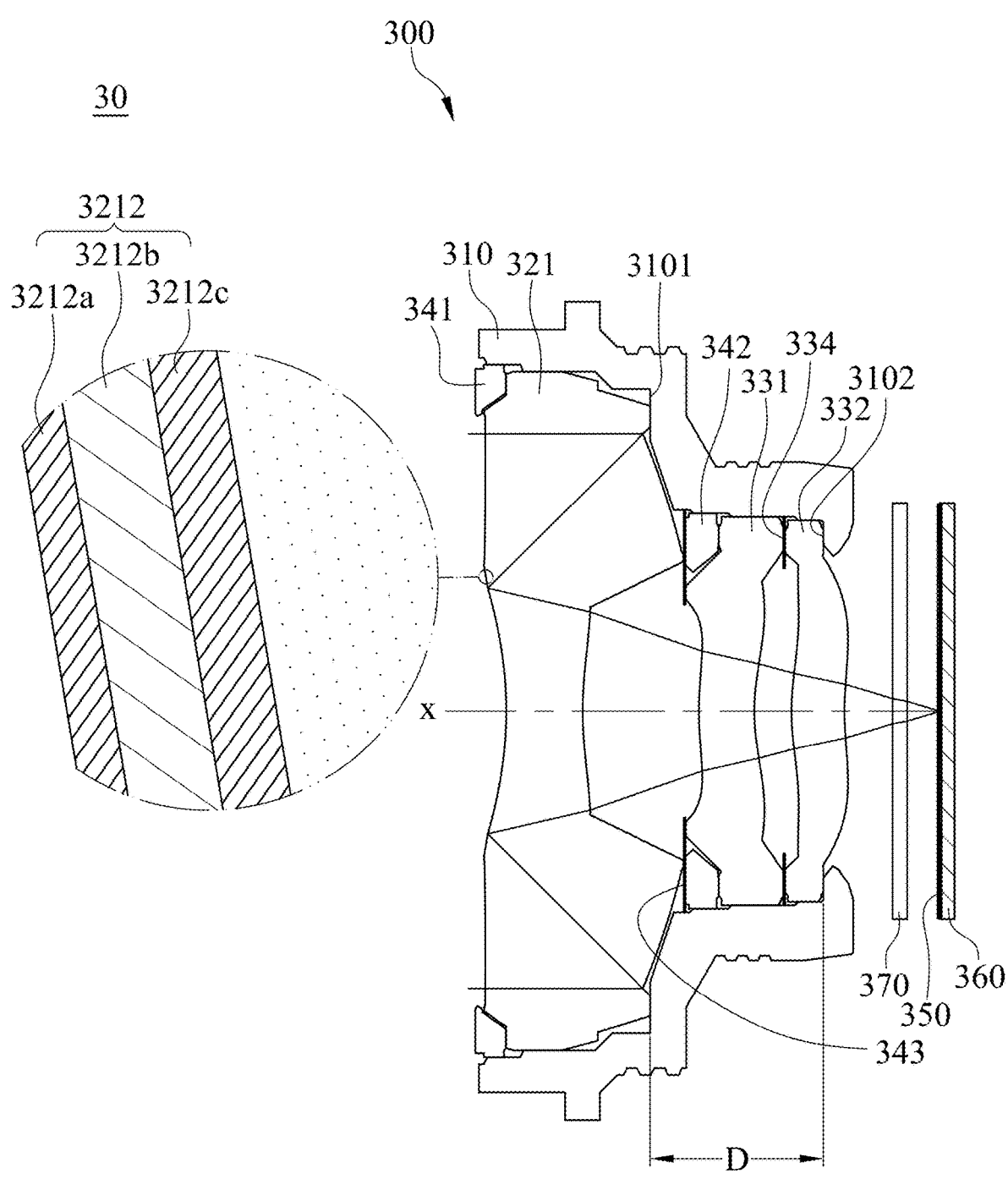
FIG. 3 is a schematic view of a camera module according to the 3rd embodiment of the present disclosure.

FIG. 3 is a schematic view of a camera module 30 according to the 3rd embodiment of the present disclosure. In FIG. 3, the camera module 30 includes an imaging lens assembly module 300 and an image sensor 360, wherein the image sensor 360 is disposed on an image surface 350 of the imaging lens assembly module 300. The imaging lens assembly module 300 includes a lens barrel 310, a catadioptric lens assembly (its reference numeral is omitted), an imaging lens assembly (its reference numeral is omitted), a first fixing element 341, a second fixing element 342 and a filter 370, wherein the catadioptric lens assembly, the imaging lens assembly, the first fixing element 341 and the second fixing element 342 are disposed in the lens barrel 310, and the filter 370 is disposed between the lens barrel 310 and the image surface 350.

The lens barrel 310 has a first relying surface 3101 and a second relying surface 3102, wherein both of the first relying surface 3101 and the second relying surface 3102 face towards an object side of the imaging lens assembly module 300. The catadioptric lens assembly relies on the first relying surface 3101 of the lens barrel 310, and includes one catadioptric lens element 321; specifically, the catadioptric lens element 321 relies on the first relying surface 3101. The imaging lens assembly is disposed on an image side of the catadioptric lens assembly, and relies on the second relying surface 3102 of the lens barrel 310; in detail, the imaging lens assembly includes two imaging lens elements 331, 332, which are disposed in the lens barrel 310 in order from the object side to the image side of the imaging lens assembly module 300, and relies on the second relying surface 3102 via the imaging lens element 332. The first fixing element 341 is for fixing the catadioptric lens assembly to the lens barrel 310, that is, the catadioptric lens element 321 is fixed between the first fixing element 341 and the first relying surface 3101 of the lens barrel 310. The second fixing element 342 is for fixing the imaging lens assembly to the lens barrel 310, that is, the imaging lens elements 331, 332 are fixed between the second fixing element 342 and the second relying surface 3102 of the lens barrel 310. The catadioptric lens assembly is for processing at least twice internal reflections of an image light in the imaging lens assembly module 300, and for providing optical refractive power.

The catadioptric lens assembly and the imaging lens assembly do not physically rely on each other, and forms a gap therebetween, and the imaging lens assembly module 300 can further include a light blocking sheet 343. The light blocking sheet 343 is disposed in the gap between the catadioptric lens assembly and the imaging lens assembly. Specifically, according to the 3rd embodiment, the gap is formed between the catadioptric lens element 321 and the imaging lens element 331, and the light blocking sheet 343 and the second fixing element 342 are located in the gap.

Further, the imaging lens assembly module 300 can further include another light blocking sheet 334, which is disposed between the imaging lens elements 331, 332.

According to the 3rd embodiment, each of the first fixing element 341 and the second fixing element 342 is a retainer.

The catadioptric lens element 321 include a first optical portion (its reference numeral is omitted), a second optical portion (its reference numeral is omitted) and a light absorbing portion 3212. The optical axis x of the imaging lens assembly module 300 passes through the first optical portion, the second optical portion surrounds the first optical portion, and is disposed coaxially with the first optical portion. The light absorbing portion 3212 is disposed between the first optical portion and the second optical portion, and the light absorbing portion 3212 is disposed coaxially with the first optical portion and the second optical portion. Each of the first optical portion and the second optical portions includes at least one optical curved surface. The light absorbing portion 3212 has a light eliminating film (its reference numeral is omitted), which is located on one surface (which is substrate) of the light absorbing portion 3212. The light eliminating film includes, in order from an outer side to an inner side (according to the 3rd embodiment of FIG. 3, that is, from the object side to the image side of the imaging lens assembly module 300), a first anti-reflecting layer 3212a, a light absorbing layer 3212b and a second anti-reflecting layer 3212c. The first anti-reflecting layer 3212a is for reducing a reflectivity of an outer side of the light absorbing portion 3212. The light absorbing layer 3212b is for absorbing a non-imaging light of the imaging lens assembly module 300, wherein the light absorbing layer 3212b can include at least one metal thin layer. The second anti-reflecting layer 3212c is for reducing a reflectivity of an inner side of the light absorbing portion 3212. Each of the first anti-reflecting layer 3212a and the second anti-reflecting layer 3212c can include at least one optical thin film.

Please refer to Table 3A, Table 3B and Table 3C as follows. In Table 3A, Table 3B and Table 3C, the material and the refractive index of the substrate of the light absorbing portion 3212, and the first anti-reflecting layer 3212a, the light absorbing layer 3212b and the second anti-reflecting layer 3212c of the light eliminating film according to 1st example, 2nd example and 3rd example of the 3rd embodiment are listed, respectively.

TABLE 3A

| the 1st example of the 3rd embodiment | | |
|---|---|---|
| thin film | material | refractive index |
| substrate | plastic | 1.55 |
| second anti-reflecting layer | 1 TiO$_2$ | 2.32 |
| | 2 SiO$_2$ | 1.47 |
| | 3 TiO$_2$ | 2.32 |
| | 4 SiO$_2$ | 1.47 |
| | 5 TiO$_2$ | 2.32 |
| | 6 SiO$_2$ | 1.47 |
| light absorbing layer | 7 Cr | — |
| | 8 Cr$_2$O$_3$ | 2.32 |
| | 9 SiO$_2$ | 1.47 |
| | 10 Cr | — |
| | 11 SiO$_2$ | 1.47 |
| | 12 Cr | — |
| | 13 SiO$_2$ | 1.47 |
| | 14 Cr$_2$O$_3$ | 2.32 |
| | 15 Cr | — |
| first anti-reflecting layer | 16 SiO$_2$ | 1.47 |
| | 17 TiO$_2$ | 2.32 |
| | 18 SiO$_2$ | 1.47 |
| | 19 TiO$_2$ | 2.32 |
| | 20 SiO$_2$ | 1.47 |

TABLE 3B

| the 2nd example of the 3rd embodiment | | |
|---|---|---|
| thin film | material | refractive index |
| substrate | plastic | 1.55 |
| second anti-reflecting layer | 1 TiO$_2$ | 2.32 |
| | 2 SiO$_2$ | 1.47 |
| | 3 TiO$_2$ | 2.32 |
| | 4 SiO$_2$ | 1.47 |
| | 5 TiO$_2$ | 2.32 |
| | 6 SiO$_2$ | 1.47 |
| light absorbing layer | 7 Cr | — |
| | 8 Cr$_2$O$_3$ | 2.32 |
| | 9 SiO$_2$ | 1.47 |
| | 10 Cr | — |
| | 11 SiO$_2$ | 1.47 |
| | 12 Cr | — |
| | 13 SiO$_2$ | 1.47 |
| | 14 Cr$_2$O$_3$ | 2.32 |
| | 15 Cr | — |
| first anti-reflecting layer | 16 SiO$_2$ | 1.47 |
| | 17 Cr$_2$O$_3$ | 2.32 |
| | 18 SiO$_2$ | 1.47 |
| | 19 Cr$_2$O$_3$ | 2.32 |
| | 20 SiO$_2$ | 1.47 |

TABLE 3C

| the 3rd example of the 3rd embodiment | | |
|---|---|---|
| thin film | material | refractive index |
| substrate | plastic | 1.55 |
| second anti-reflecting layer | 1 TiO$_2$ | 2.32 |
| | 2 SiO$_2$ | 1.47 |
| | 3 Cr$_2$O$_3$ | 2.32 |
| | 4 SiO$_2$ | 1.47 |
| | 5 Cr$_2$O$_3$ | 2.32 |
| | 6 SiO$_2$ | 1.47 |
| light absorbing layer | 7 Cr | — |
| | 8 Cr$_2$O$_3$ | 2.32 |
| | 9 SiO$_2$ | 1.47 |
| | 10 CrO | — |
| | 11 SiO$_2$ | 1.47 |
| | 12 CrO | — |
| | 13 SiO$_2$ | 1.47 |
| | 14 Cr$_2$O$_3$ | 2.32 |
| | 15 Cr | — |
| first anti-reflecting layer | 16 SiO$_2$ | 1.47 |
| | 17 TiO$_2$ | 2.32 |
| | 18 SiO$_2$ | 1.47 |
| | 19 TiO$_2$ | 2.32 |
| | 20 SiO$_2$ | 1.47 |

Moreover, each of the first optical portion and the second optical portion of the catadioptric lens element 321 includes an optical reflecting surface (its reference numeral is omitted), wherein the optical reflecting surface of the first optical portion is located on the object-side surface of the catadioptric lens element 321, the optical reflecting surface of the second optical portion is located on the image-side surface of the catadioptric lens element 321. In other words, according to the 3rd embodiment, the single catadioptric lens element 321 can fold the light path.

In FIG. 3, when a distance along the optical axis x between the first relying surface 3101 and the second relying surface 3102 is D, a maximum field of view of the imaging lens assembly module 300 is FOV, and an f-number of the imaging lens assembly module 300 is FNO, the datum of the 3rd embodiment are listed as the following Table 3D.

TABLE 3D

| D (mm) | 2.49 | FNO | 2.2 |
|--------|------|-----|-----|
| FOV (degrees) | 16.5 | | |

4th Embodiment

Figure 4A:
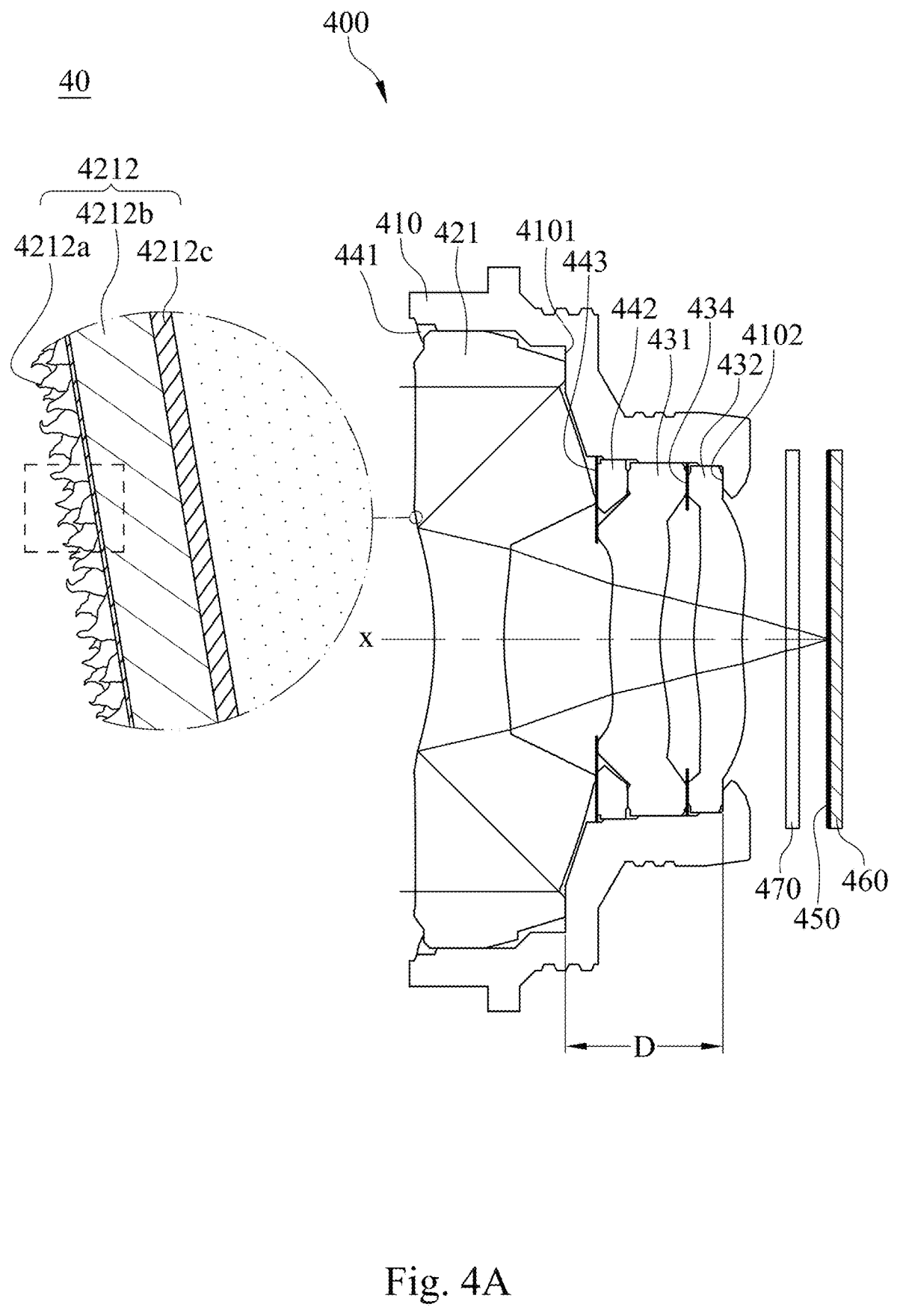

FIG. 4A is a schematic view of a camera module 40 according to the 4th embodiment of the present disclosure. In FIG. 4A, the camera module 40 includes an imaging lens assembly module 400 and an image sensor 460, wherein the image sensor 460 is disposed on an image surface 450 of the imaging lens assembly module 400. The imaging lens assembly module 400 includes a lens barrel 410, a catadioptric lens assembly (its reference numeral is omitted), an imaging lens assembly (its reference numeral is omitted), a first fixing element 441, a second fixing element 442 and a filter 470, wherein the catadioptric lens assembly, the imaging lens assembly, the first fixing element 441 and the second fixing element 442 are disposed in the lens barrel 410, and the filter 470 is disposed between the lens barrel 410 and the image surface 450.

The lens barrel 410 has a first relying surface 4101 and a second relying surface 4102, wherein both of the first relying surface 4101 and the second relying surface 4102 face towards an object side of the imaging lens assembly module 400. The catadioptric lens assembly relies on the first relying surface 4101 of the lens barrel 410, and includes one catadioptric lens element 421; specifically, the catadioptric lens element 421 relies on the first relying surface 4101. The imaging lens assembly is disposed on an image side of the catadioptric lens assembly, and relies on the second relying surface 4102 of the lens barrel 410; in detail, the imaging lens assembly includes two imaging lens elements 431, 432, which are disposed in the lens barrel 410 in order from the object side to the image side of the imaging lens assembly module 400, and relies on the second relying surface 4102 via the imaging lens element 432. The first fixing element 441 is for fixing the catadioptric lens assembly to the lens barrel 410, that is, the catadioptric lens element 421 is fixed between the first fixing element 441 and the first relying surface 4101 of the lens barrel 410. The second fixing element 442 is for fixing the imaging lens assembly to the lens barrel 410, that is, the imaging lens elements 431, 432 are fixed between the second fixing element 442 and the second relying surface 4102 of the lens barrel 410. The catadioptric lens assembly is for processing at least twice internal reflections of an image light in the imaging lens assembly module 400, and for providing optical refractive power.

The catadioptric lens assembly and the imaging lens assembly do not physically rely on each other, and forms a gap therebetween, and the imaging lens assembly module 400 can further include a light blocking sheet 443. The light blocking sheet 443 is disposed in the gap between the catadioptric lens assembly and the imaging lens assembly. Specifically, according to the 4th embodiment, the gap is formed between the catadioptric lens element 421 and the imaging lens element 431, and the light blocking sheet 443 and the second fixing element 442 are located in the gap.

Further, the imaging lens assembly module 400 can further include another light blocking sheet 434, which is disposed between the imaging lens elements 431, 432.

According to the 4th embodiment, the first fixing element 441 is fixing glue, and the second fixing element 442 is a retainer.

Figure 4B:
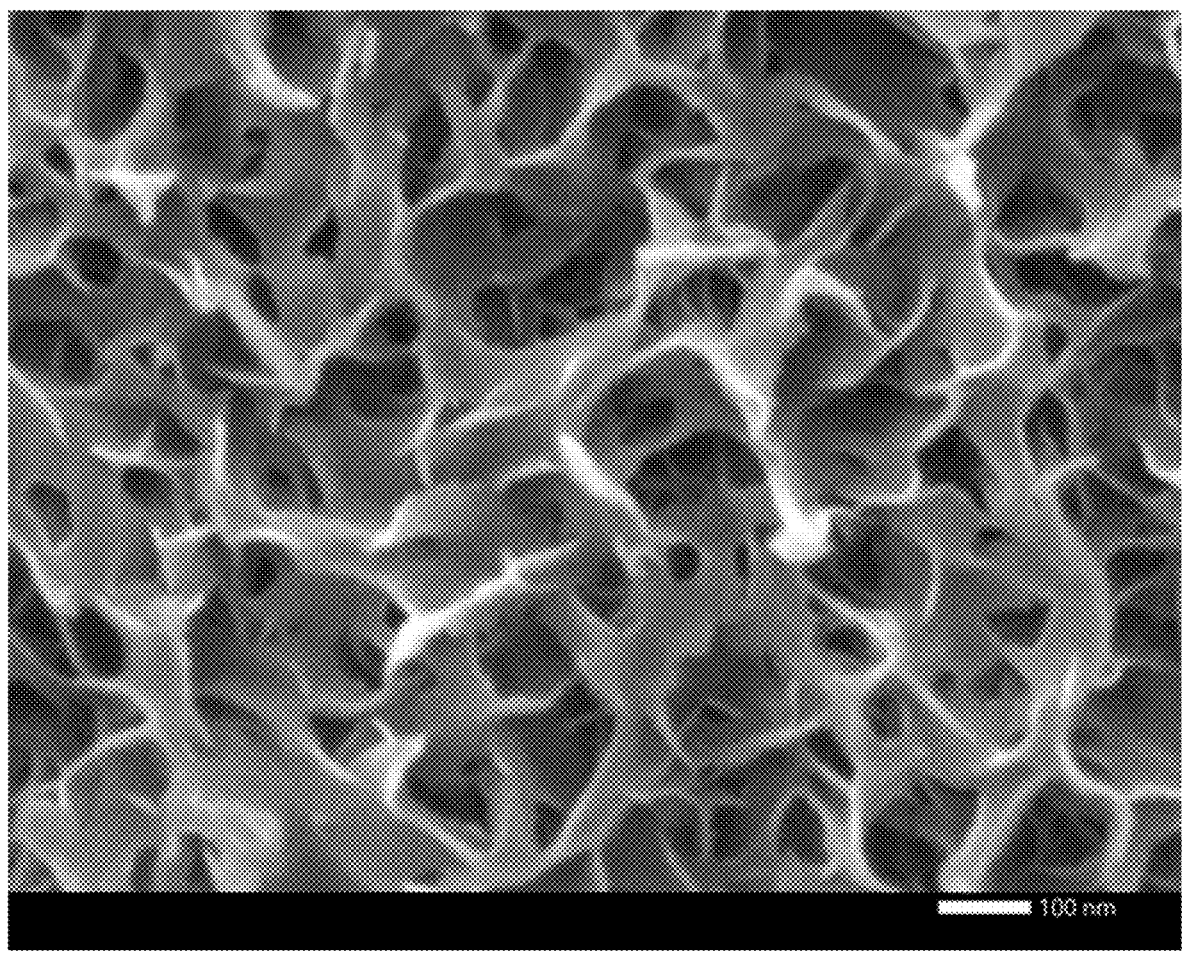
FIG. 4B is a picture of the nano-ridged protruding structures according to the 4th embodiment of FIG. 4A captured by an electron microscope.

The catadioptric lens element 421 include a first optical portion (its reference numeral is omitted), a second optical portion (its reference numeral is omitted) and a light absorbing portion 4212. The optical axis x of the imaging lens assembly module 400 passes through the first optical portion, the second optical portion surrounds the first optical portion, and is disposed coaxially with the first optical portion. The light absorbing portion 4212 is disposed between the first optical portion and the second optical portion, and the light absorbing portion 4212 is disposed coaxially with the first optical portion and the second optical portion. Each of the first optical portion and the second optical portions includes at least one optical curved surface. The light absorbing portion 4212 has a light eliminating film (its reference numeral is omitted), which is located on one surface (which is substrate) of the light absorbing portion 4212. The light eliminating film includes, in order from an outer side to an inner side (according to the 4th embodiment of FIG. 4A, that is, from the object side to the image side of the imaging lens assembly module 400), a first anti-reflecting layer 4212a, a light absorbing layer 4212b and a second anti-reflecting layer 4212c. The first anti-reflecting layer 4212a is for reducing a reflectivity of an outer side of the light absorbing portion 4212. The light absorbing layer 4212b is for absorbing a non-imaging light of the imaging lens assembly module 400, wherein the light absorbing layer 4212b can include at least one metal thin layer. The second anti-reflecting layer 4212c is for reducing a reflectivity of an inner side of the light absorbing portion 4212. The second anti-reflecting layer 4212c can include at least one optical thin film. The first anti-reflecting layer 4212a can include a plurality of nano-ridged protruding structures (its reference numeral is omitted). FIG. 4B is a picture of the nano-ridged protruding structures according to the 4th embodiment of FIG. 4A captured by an electron microscope. In FIG. 4B, the nano-ridged protruding structures on the first anti-reflecting layer 4212a are shown.

Please refer to Table 4A as follows. In Table 4A, the material and the refractive index of the substrate of the light absorbing portion 4212, and the first anti-reflecting layer 4212a, the light absorbing layer 4212b and the second anti-reflecting layer 4212c of the light eliminating film according to 1st example of the 4th embodiment are listed.

TABLE 4A

| the 1st example of the 4th embodiment | | | |
|---------------------------------------|---|---------|------------------|
| thin film | | material | refractive index |
| substrate | | plastic | 1.55 |
| second anti-reflecting | 1 | $TiO_2$ | 2.32 |
| layer | 2 | $SiO_2$ | 1.47 |
| light absorbing layer | 3 | Cr | — |
| | 4 | $Cr_2O_3$ | 2.32 |
| | 5 | $SiO_2$ | 1.47 |
| | 6 | CrO | — |
| | 7 | $SiO_2$ | 1.47 |
| | 8 | CrO | — |
| | 9 | $SiO_2$ | 1.47 |
| | 10 | $Cr_2O_3$ | 2.32 |
| | 11 | Cr | — |
| first anti-reflecting | 12 | $SiO_2$ | 1.47 |
| layer | 13 | $Al_2O_3$ | 1.63 |
| | | (nano-ridged protruding structures) | |

Moreover, each of the first optical portion and the second optical portion of the catadioptric lens element 421 includes an optical reflecting surface (its reference numeral is omitted), wherein the optical reflecting surface of the first optical portion is located on the object-side surface of the catadioptric lens element 421, the optical reflecting surface of the second optical portion is located on the image-side surface of the catadioptric lens element 421. In other words, according to the 4th embodiment, the single catadioptric lens element 421 can fold the light path.

In FIG. 4A, when a distance along the optical axis x between the first relying surface 4101 and the second relying surface 4102 is D, a maximum field of view of the imaging lens assembly module 400 is FOV, and an f-number of the imaging lens assembly module 400 is FNO, the datum of the 4th embodiment are listed as the following Table 4B.

TABLE 4B

| D (mm) | 2.49 | FNO | 2.2 |
| FOV (degrees) | 16.5 | | |

5th Embodiment

Figure 5A:
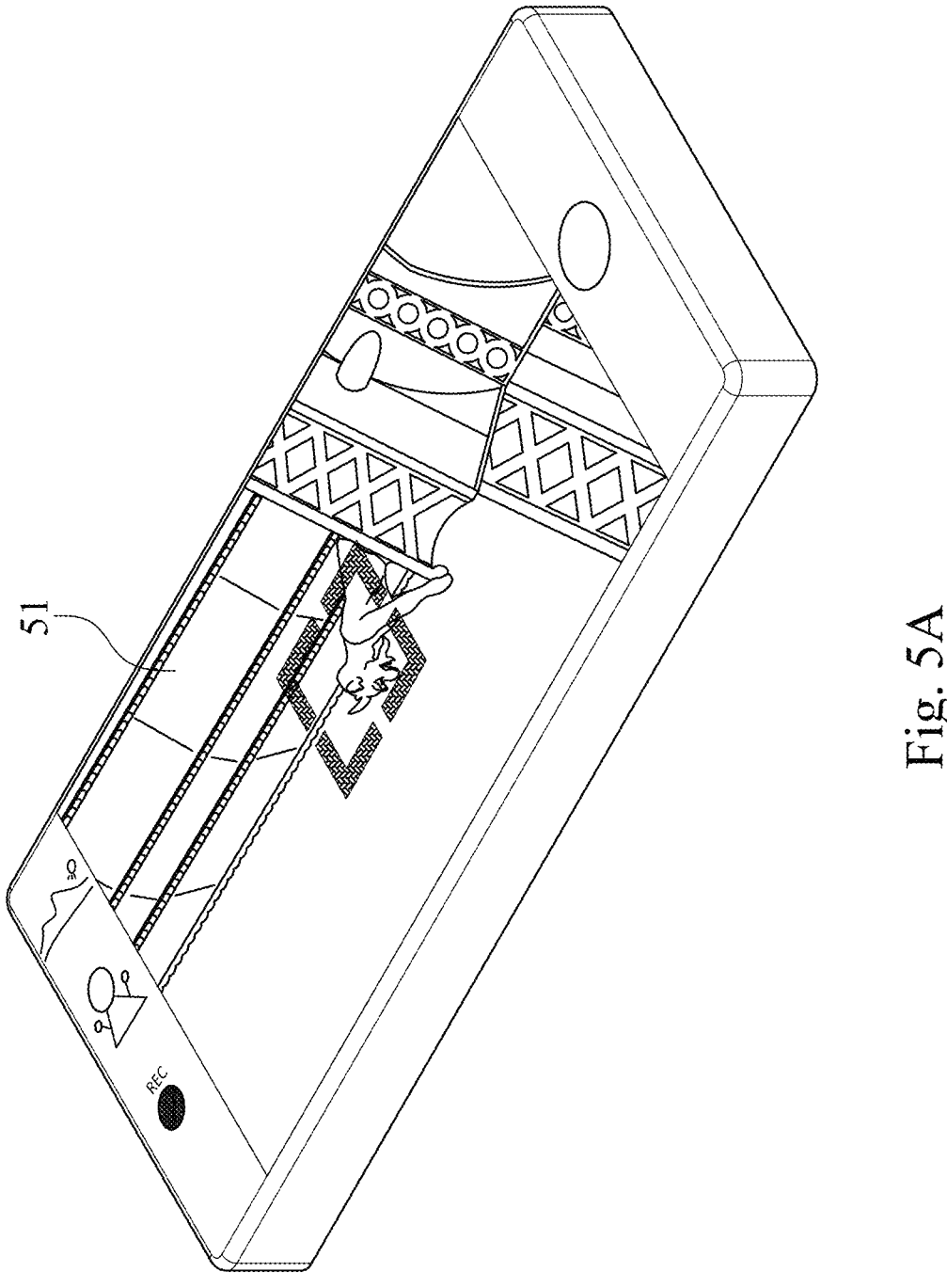
FIG. 5A is a schematic view of an electronic device according to the 5th embodiment of the present disclosure.
Figure 5B:
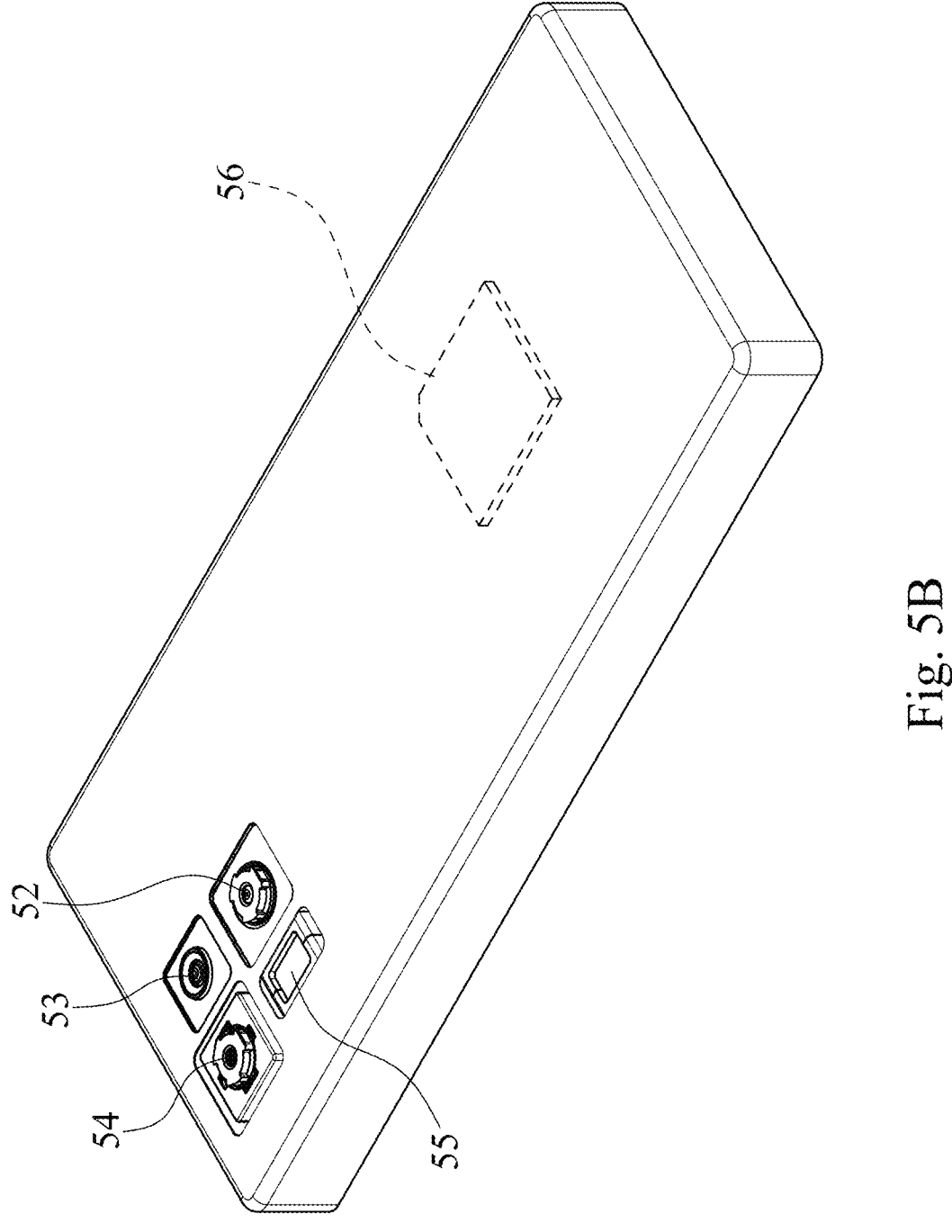
FIG. 5B is another schematic view of the electronic device according to the 5th embodiment of FIG. 5A.

FIG. 5A is a schematic view of an electronic device 5 according to the 5th embodiment of the present disclosure. FIG. 5B is another schematic view of the electronic device 5 according to the 5th embodiment of FIG. 5A. As shown in FIG. 5A and FIG. 5B, the electronic device 5 is a smartphone. The electronic device 5 includes four camera modules 52, 53, 54, 55 and a user interface 51, wherein each of the camera modules 52, 53, 54, 55 includes an imaging lens assembly module (not shown) and an image sensor (not shown), the image sensor is disposed on an image surface (not shown) of the imaging lens assembly module. Specifically, each of the imaging lens assembly modules can be any one imaging lens assembly module of the 1st embodiment to the 4th embodiment, but the present disclosure will not be limited thereto. Further, the camera module 52 is a high-pixel camera module, the camera module 53 is a telephoto camera module, the camera module 54 is an ultra-wide-angle camera module, the camera module 55 is a telephoto camera module with light path folding element, and the user interface 51 is a touch screen, but the present disclosure is not limited thereto.

A user enters a shooting mode via the user interface 51. The user interface 51 is used to display the screen, and the shooting angle can be manually adjusted to switch between different camera modules 52, 53, 54, 55. At this moment, the camera modules 52, 53, 54, 55 collect an imaging light on the respective image sensor and output electronic signals associated with images to an image signal processor (ISP) 56.

As shown in FIG. 5A and FIG. 5B, according to the camera specifications of the electronic device 5, the electronic device 5 can further include an optical anti-shake mechanism (figure is omitted). Further, the electronic device 5 can further include at least one focusing assisting module (figure is omitted) and at least one sensing component (figure is omitted). The focusing assisting module can be a flash module, an infrared distance measurement component, a laser focus module, etc. The flash module is for compensating the color temperature. The sensing component can have functions for sensing physical momentum and kinetic energies, such as an accelerator, a gyroscope, and a Hall effect element, so as to sense shaking or jitters applied by hands of the user or external environments. Thus the auto-focus function and the optical anti-shake mechanism of the imaging lens assembly disposed on the electronic device 5 can function to obtain a great image quality and facilitate the electronic device 5 according to the present disclosure to have a capturing function with multiple modes, such as taking optimized selfies, high dynamic range (HDR) with a low light source, 4K resolution recording, etc. Furthermore, the user can visually see the captured image of the camera through the user interface 51 and manually operate the view finding range on the user interface 51 to achieve the auto focus function of what you see is what you get.

Furthermore, the imaging lens assembly module, the image sensor, the optical anti-shake mechanism, the sensing component and the focusing assisting module can be disposed on a flexible printed circuit board (FPC) (figure is omitted) and electrically connected to the image signal processor 56 and so on via a connector (figure is omitted) so as to operate a picturing process. Recent electronic devices such as smartphones have a trend towards thinness and lightness. The imaging lens assembly and the related elements are disposed on a FPC and circuits are assembled into a main board of an electronic device by a connector. Hence, it can fulfill a mechanical design of a limited inner space of the electronic device and a requirement of a circuit layout and obtain a larger allowance, and it is also favorable for an autofocus function of the imaging lens assembly obtaining a flexible control via a touch screen of the electronic device. In the 5th embodiment, the electronic device 5 can include a plurality of the sensing components and a plurality of the focusing assisting modules, and the sensing components and the focusing assisting modules are disposed on an FPC and another at least one FPC (figure is omitted) and electrically connected to the image signal processor 56 and so on via a corresponding connector so as to operate a picturing process. In other embodiments (figure is omitted), the sensing components and auxiliary optical elements can be disposed on a main board of an electronic device or a board of the other form according to a mechanical design and a requirement of a circuit layout.

Furthermore, the electronic device 5 can further include, but not be limited to, a display, a control unit, a storage unit, a random-access memory (RAM), a read-only memory (ROM), or the combination thereof.

Figure 5C:
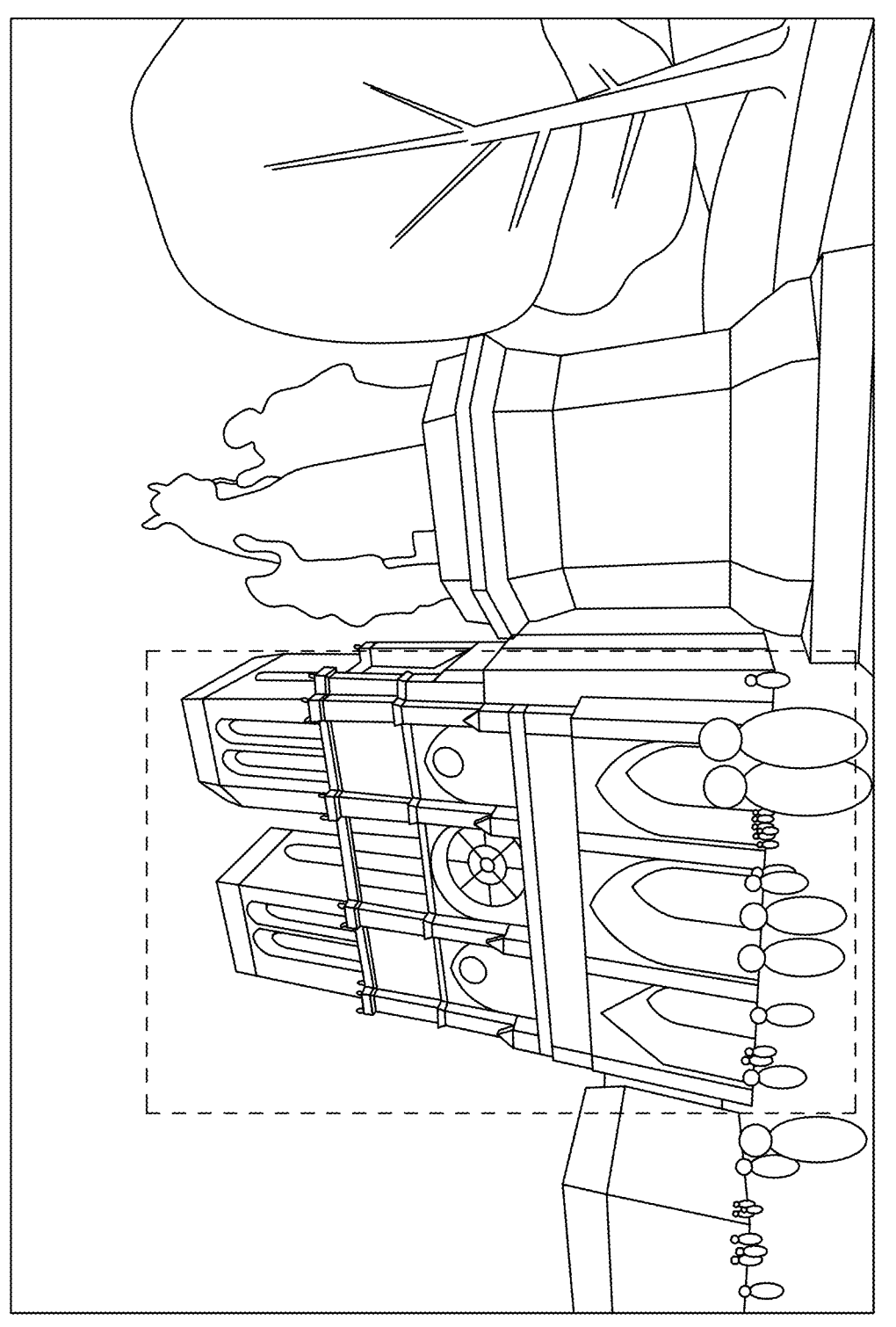
FIG. 5C is a schematic view of an image captured via the electronic device according to the 5th embodiment of FIG. 5A.

FIG. 5C is a schematic view of an image captured via the electronic device 5 according to the 5th embodiment of FIG. 5A. As shown in FIG. 5C, a larger ranged image can be captured via the camera module 54 (that is, the ultra-wide-angle camera module), which has a function for containing more views.

Figure 5D:
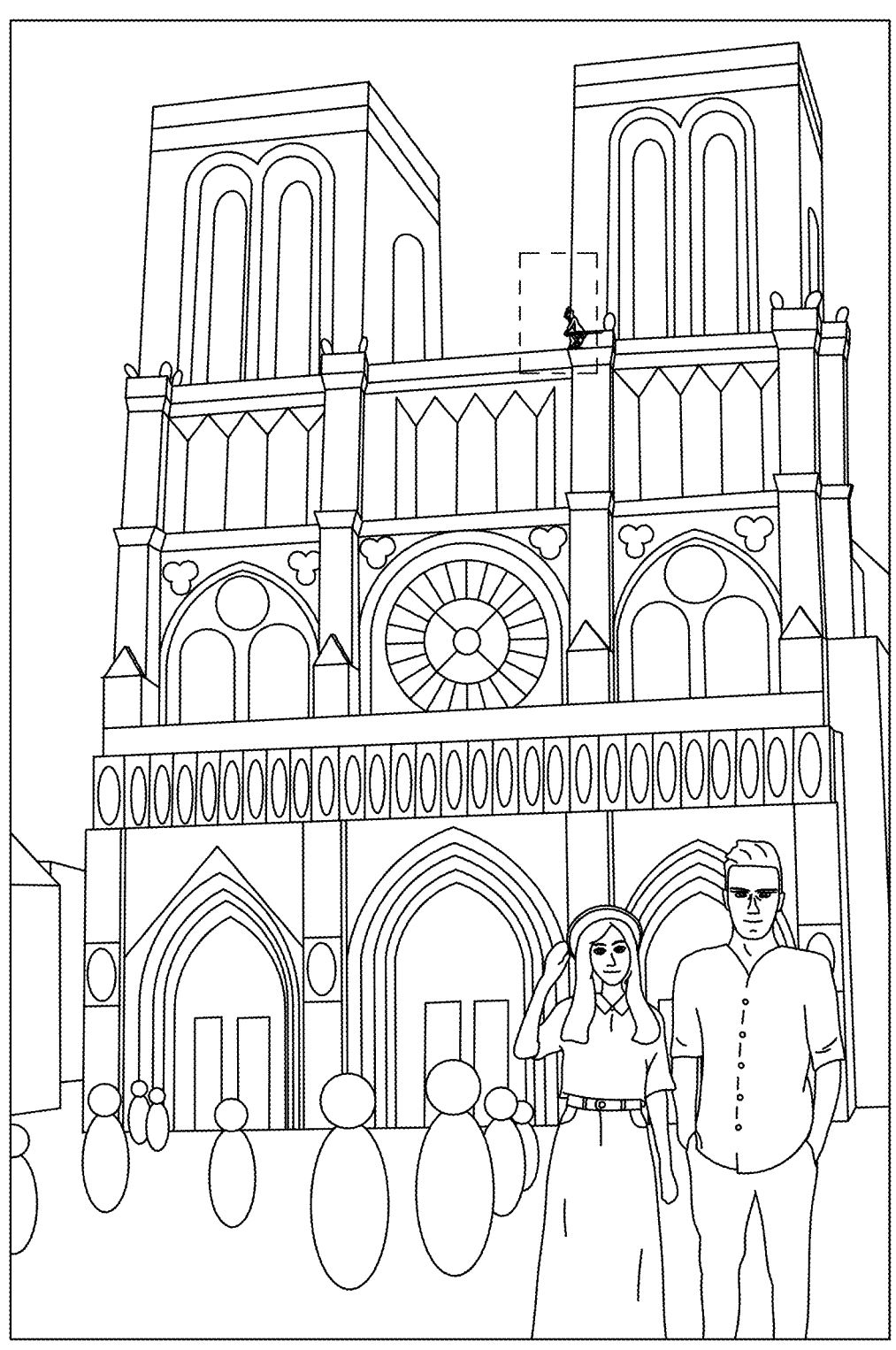
FIG. 5D is another schematic view of the image captured via the electronic device according to the 5th embodiment of FIG. 5A.

FIG. 5D is another schematic view of the image captured via the electronic device 5 according to the 5th embodiment of FIG. 5A. As shown in FIG. 5D, a certain ranged and high-pixel image can be captured via the camera module 52 (that is, the high-pixel camera module), which has a function for high resolution and low distortion.

Figure 5E:
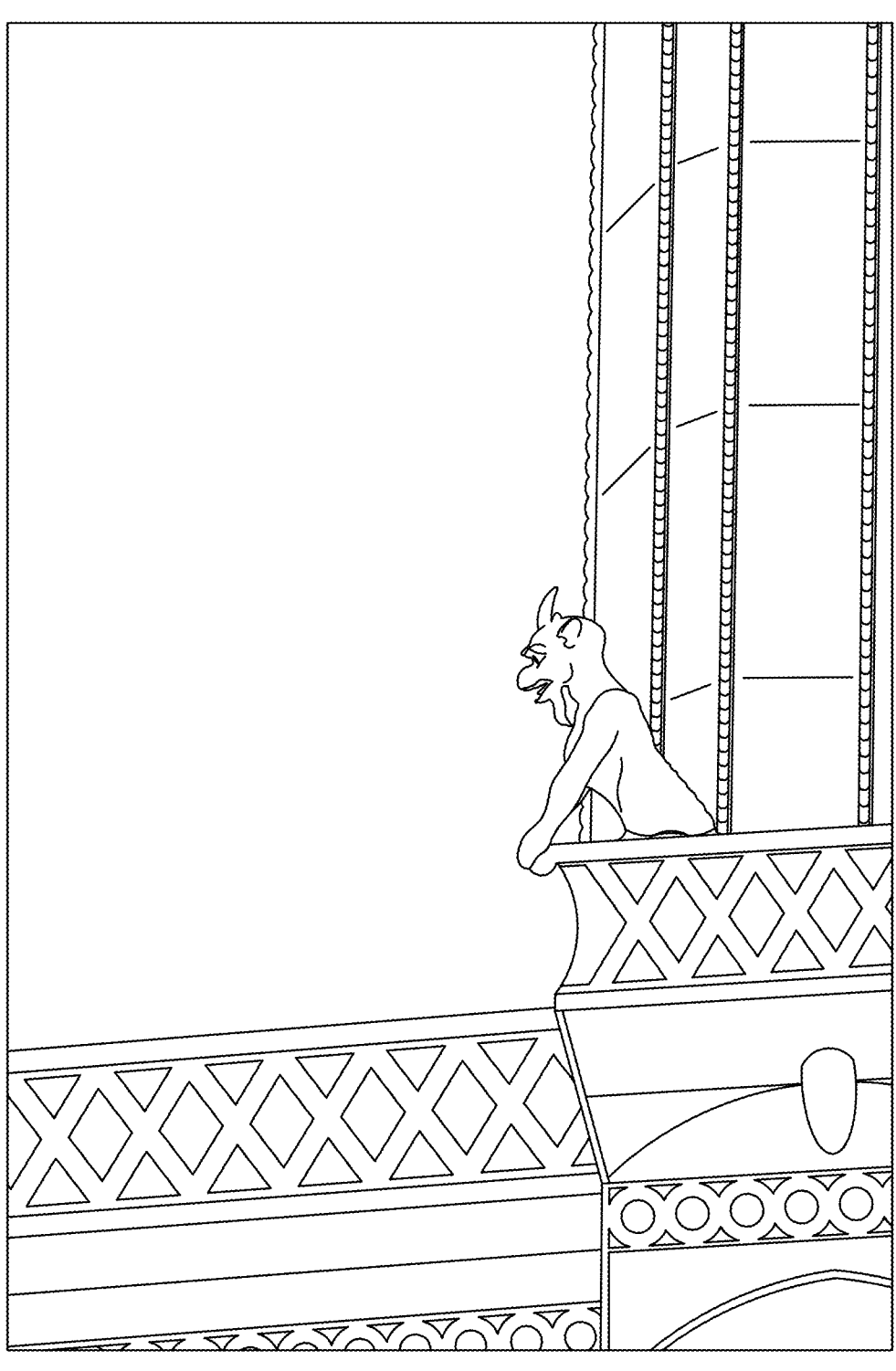
FIG. 5E is the other schematic view of the image captured via the electronic device according to the 5th embodiment of FIG. 5A.

FIG. 5E is the other schematic view of the image captured via the electronic device 5 according to the 5th embodiment of FIG. 5A. As shown in FIG. 5E, a far image can be captured and enlarged to a high magnification via the camera modules 53, 55 (which are, the telephoto camera modules), which has a function for a high magnification.

As shown in FIG. 5C to FIG. 5E, when an image is captured via different camera modules 52, 53, 54, 55 having various focal lengths and processed via a technology of an image processing, a zoom function of the electronic device 5 can be achieved.

6th Embodiment

Figure 6:
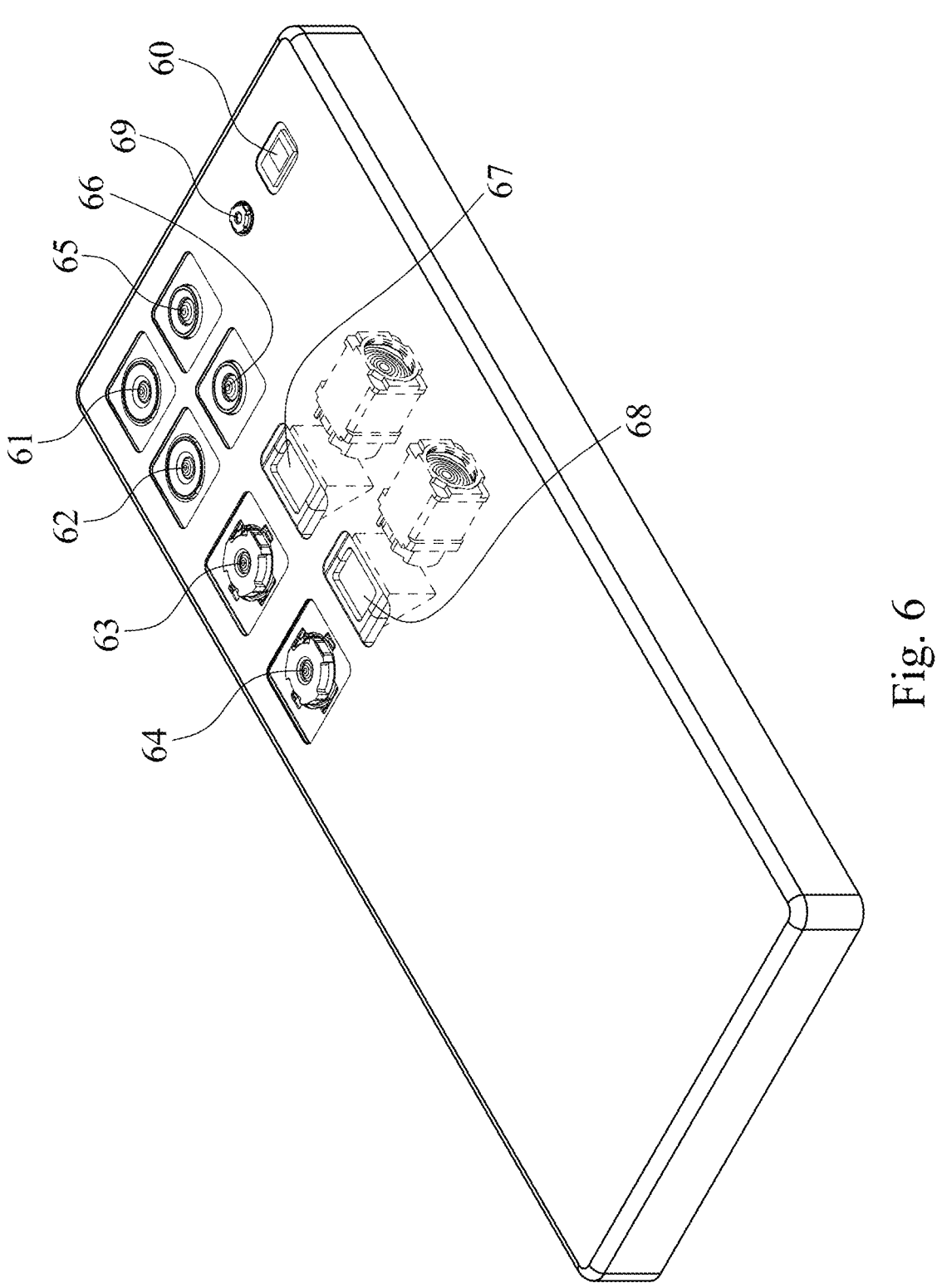
FIG. 6 is a schematic view of an electronic device according to the 6th embodiment of the present disclosure.

FIG. 6 is a schematic view of an electronic device 6 according to the 6th embodiment of the present disclosure.

As shown in FIG. 6, the electronic device 6 is a smartphone. The electronic device 6 includes a plurality of camera modules 61, 62, 63, 64, 65, 66, 67, 68, 69, which include an imaging lens assembly module (not shown) and an image sensor (not shown), respectively, the image sensor is disposed on an image surface (not shown) of the imaging lens assembly module. Specifically, each of the imaging lens assembly modules can be any one imaging lens assembly module of the 1st embodiment to the 4th embodiment, but the present disclosure will not be limited thereto. Further, each of two camera modules 61, 62 is an ultra-wide-angle camera module, each of two camera modules 63, 64 is a wide angle camera module, each of four camera modules 65, 66, 67, 68 is a telephoto camera module, wherein the camera modules 67, 68 can fold the light path, and the camera module 69 is Time-Of-Flight (TOF) module and can be other types of camera module, which will not be limited to the present arrangement.

According to the camera specifications of the electronic device 6, the electronic device 6 can further include an optical anti-shake mechanism (figure is omitted). Further, the electronic device 6 can further include at least one focusing assisting module (figure is omitted) and at least one sensing component (figure is omitted). The focusing assisting module can be a flash module 60, an infrared distance measurement component, a laser focus module, etc. The flash module 60 is for compensating the color temperature. The sensing component can have functions for sensing physical momentum and kinetic energies, such as an accelerator, a gyroscope, and a Hall effect element, so as to sense shaking or jitters applied by hands of the user or external environments. Thus, the autofocus function and the optical anti-shake mechanism of the camera module disposed on the electronic device 6 can function to obtain a great image quality and facilitate the electronic device 6 according to the present disclosure to have a capturing function with multiple modes, such as taking optimized selfies, high dynamic range (HDR) with a low light source, 4K resolution recording, etc.

Further, all of other structures and dispositions according to the 6th embodiment are the same as the structures and the dispositions according to the 5th embodiment, and will not be described again herein.

7th Embodiment

Figure 7A:
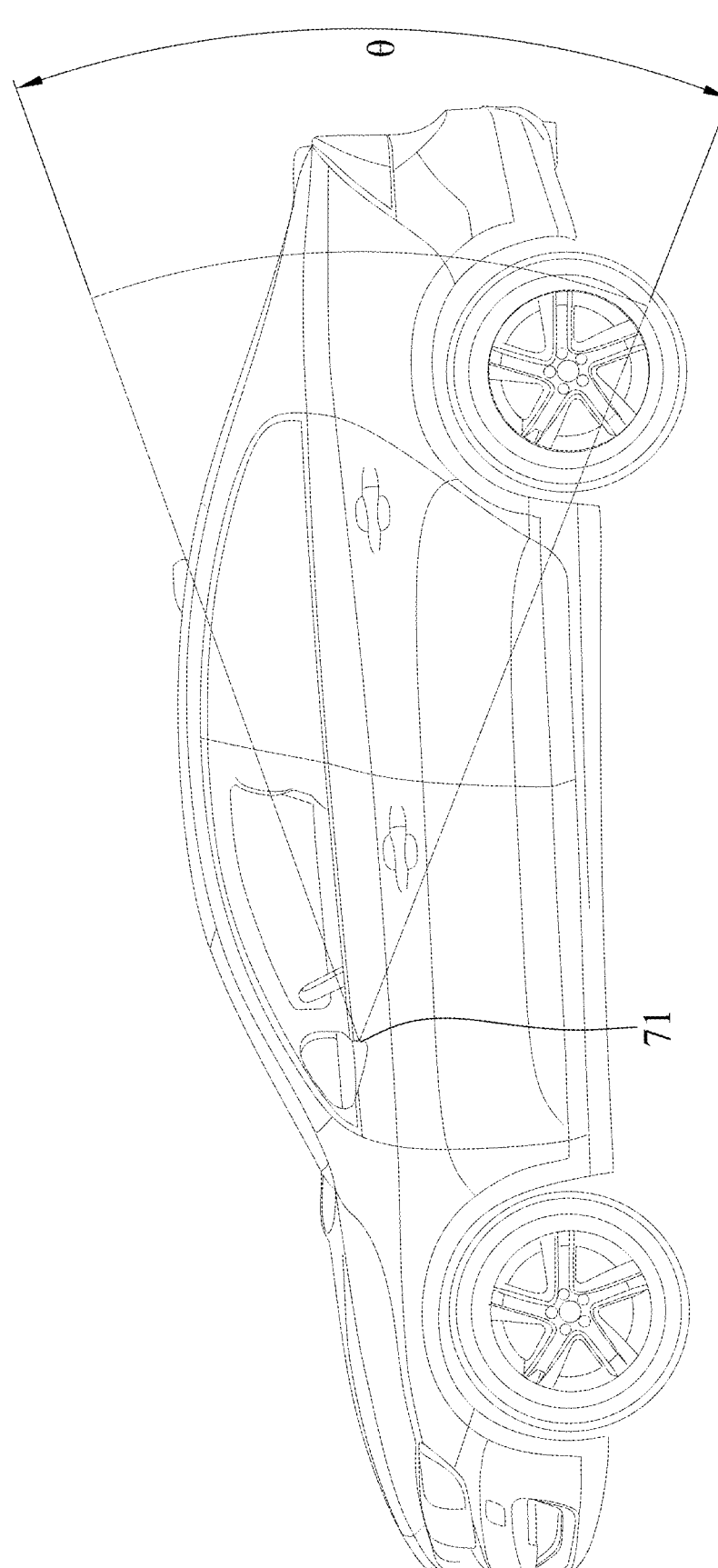
FIG. 7A is a schematic view of a vehicle instrument according to the 7th embodiment of the present disclosure.
Figure 7B:
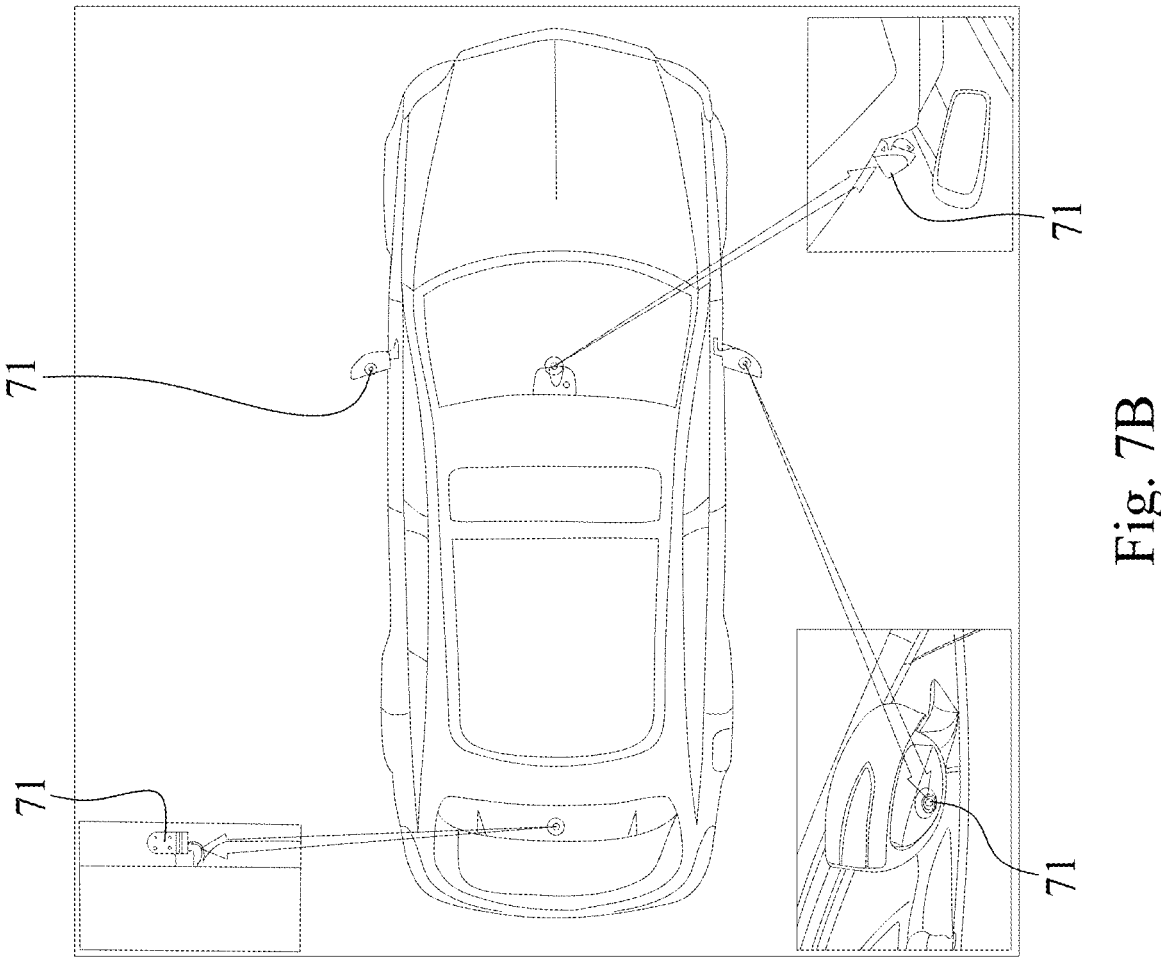
FIG. 7B is another schematic view of the vehicle instrument according to the 7th embodiment in FIG. 7A.
Figure 7C:
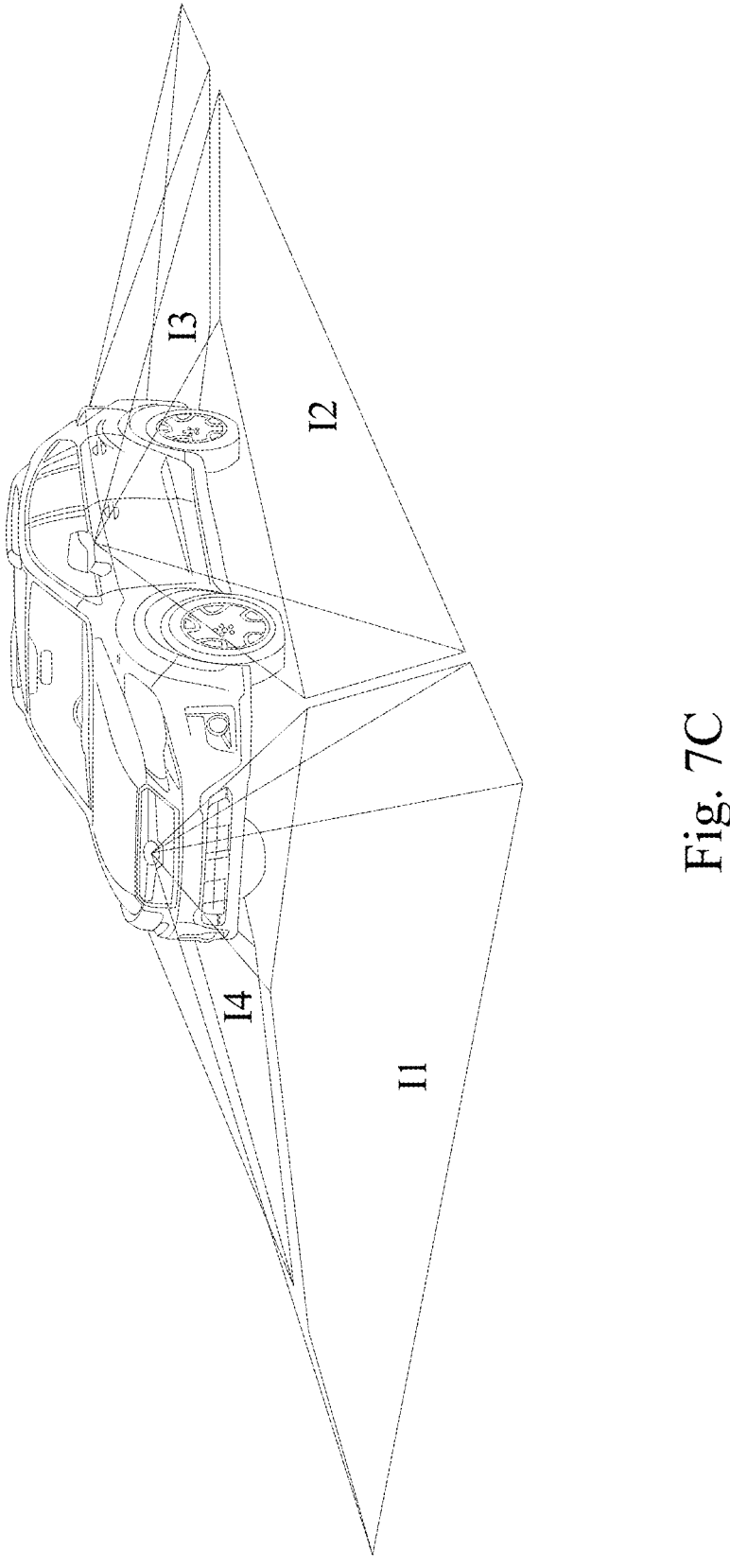
FIG. 7C is another schematic view of the vehicle instrument according to the 7th embodiment in FIG. 7A.

FIG. 7A is a schematic view of a vehicle instrument 7 according to the 7th embodiment of the present disclosure. FIG. 7B is another schematic view of the vehicle instrument 7 according to the 7th embodiment in FIG. 7A. FIG. 7C is another schematic view of the vehicle instrument 7 according to the 7th embodiment in FIG. 7A. In FIGS. 7A to 7C, the vehicle instrument 7 includes a plurality of camera modules 71. According to the 7th embodiment, a number of the camera modules 71 is six, and the camera modules 71 can be the camera module according to any one of the aforementioned 1st embodiment to 4th embodiment, but the present disclosure is not limited thereto.

In FIGS. 7A and 7B, the camera modules 71 are automotive camera modules, two of the camera modules 71 are located under rearview mirrors on a left side and a right side, respectively, and the aforementioned camera modules 71 are configured to capture the image information of a visual angle θ. In particular, the visual angle θ can satisfy the following condition: 40 degrees<θ<90 degrees. Therefore, the image information in the regions of two lanes on the left side and the right side can be captured.

In FIG. 7B, another two of the camera modules 71 can be disposed in the inner space of the vehicle instrument 7. In particular, the aforementioned two camera modules 71 are disposed on a location close to the rearview mirror inside the vehicle instrument 7 and a location close to the rear car window, respectively. Moreover, the camera modules 71 can be further disposed on the rearview mirrors of the vehicle instrument 7 on the left side and the right side except the mirror surface, respectively, but the present disclosure is not limited thereto.

In FIG. 7C, another two of the camera modules 71 can be disposed on a front end of the vehicle instrument 7 and a rear end of the vehicle instrument 7, respectively. By disposing the camera modules 71 on the front end and the rear end of the vehicle instrument 7 and under the rearview mirror on the left side of the vehicle instrument 7 and the right side of the vehicle instrument 7, it is favorable for the drivers obtaining the external space information in addition to the driving seat, such as the external space informations 11, 12, 13, 14, but the present disclosure is not limited thereto. Therefore, more visual angles can be provided to reduce the blind spot, so that the driving safety can be improved. Further, the traffic information outside of the vehicle instrument 7 can be recognized by disposing the camera modules 71 on the periphery of the vehicle instrument 7, so that the function of the automatic driving assistance can be achieved.

The foregoing description, for purpose of explanation, has been described with reference to specific examples. It is to be noted that Tables show different data of the different examples; however, the data of the different examples are obtained from experiments. The examples were chosen and described in order to best explain the principles of the disclosure and its practical applications, to thereby enable others skilled in the art to best utilize the disclosure and various examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly module, comprising:
a lens barrel having a first relying surface and a second relying surface, wherein both of the first relying surface and the second relying surface face towards an object side of the imaging lens assembly module;
a catadioptric lens assembly relying on the first relying surface of the lens barrel;
an imaging lens assembly disposed on an image side of the catadioptric lens assembly, and relying on the second relying surface of the lens barrel;
a first fixing element for fixing the catadioptric lens assembly to the lens barrel; and
a second fixing element for fixing the imaging lens assembly to the lens barrel;
wherein the catadioptric lens assembly is for processing at least twice internal reflections of an image light in the imaging lens assembly module, and for providing optical refractive power.

2. The imaging lens assembly module of claim 1, wherein the catadioptric lens assembly comprises at least one catadioptric lens element, the at least one catadioptric lens element comprises:
a first optical portion, an optical axis of the imaging lens assembly module passing through the first optical portion; and a second optical portion surrounding the first optical portion and disposed coaxially with the first optical portion;

wherein each of the first optical portion and the second optical portion comprises at least one optical curved surface.

3. The imaging lens assembly module of claim 2, wherein each of the at least one optical curved surface of the first optical portion and the at least one optical curved surface of the second optical portion is an optical aspheric surface.

4. The imaging lens assembly module of claim 2, wherein at least one of the first optical portion and the second optical portion comprises an optical reflecting surface, which is for performing at least once of the at least twice internal reflections of the image light in the imaging lens assembly module.

5. The imaging lens assembly module of claim 2, wherein each of the first optical portion and the second optical portion comprises an optical reflecting surface, both of the optical reflecting surfaces are for performing the at least twice internal reflections of the image light in the imaging lens assembly module.

6. The imaging lens assembly module of claim 2, wherein the at least one catadioptric lens element further comprises a light absorbing portion, the light absorbing portion is disposed between the first optical portion and the second optical portion, and the light absorbing portion is disposed coaxially with the first optical portion and the second optical portion.

7. The imaging lens assembly module of claim 6, wherein the light absorbing portion has a light eliminating film located on one surface of the light absorbing portion, the light eliminating film comprises, in order from an outer side to an inner side:

a first anti-reflecting layer for reducing a reflectivity of an outer side of the light absorbing portion;

a light absorbing layer for absorbing a non-imaging light of the imaging lens assembly module; and a second anti-reflecting layer for reducing a reflectivity of an inner side of the light absorbing portion.

8. The imaging lens assembly module of claim 7, wherein the light absorbing layer comprises at least one metal thin layer.

9. The imaging lens assembly module of claim 7, wherein at least one of the first anti-reflecting layer and the second anti-reflecting layer comprises a plurality of nano-ridged protruding structures.

10. The imaging lens assembly module of claim 7, wherein at least one of the first anti-reflecting layer and the second anti-reflecting layer comprises at least one optical thin film.

11. The imaging lens assembly module of claim 1, wherein the catadioptric lens assembly and the imaging lens assembly do not physically rely on each other, and forms a gap therebetween.

12. The imaging lens assembly module of claim 11, further comprising:

a light blocking sheet disposed in the gap between the catadioptric lens assembly and the imaging lens assembly.

13. The imaging lens assembly module of claim 1, wherein a distance along an optical axis between the first relying surface and the second relying surface is D, and the following condition is satisfied:

$$1 \text{ mm} < D < 8 \text{ mm}.$$

14. The imaging lens assembly module of claim 1, wherein a maximum field of view of the imaging lens assembly module is FOV, and the following condition is satisfied:

$$1 \text{ degree} \leq FOV \leq 45 \text{ degrees}.$$

15. The imaging lens assembly module of claim 1, wherein an f-number of the imaging lens assembly module is FNO, and the following condition is satisfied:

$$1.0 \leq FNO \leq 3.2.$$

16. A camera module, comprising:
the imaging lens assembly module of claim 1; and
an image sensor disposed on an image surface of the imaging lens assembly module.

17. An electronic device, comprising:
the camera module of claim 16.

* * * * *